(12) United States Patent
Kanan

(10) Patent No.: US 11,831,162 B1
(45) Date of Patent: Nov. 28, 2023

(54) SYSTEMS SOURCE ASSET BETWEEN RENEWABLE ENERGY POWER PLANTS

(71) Applicant: 8ME NOVA, LLC, El Dorado Hills, CA (US)

(72) Inventor: Nadim Kanan, Elk Grove, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/359,756

(22) Filed: Jul. 26, 2023

(51) Int. Cl.
*H02J 3/00* (2006.01)
*H02J 3/38* (2006.01)

(52) U.S. Cl.
CPC ............ *H02J 3/0073* (2020.01); *H02J 3/001* (2020.01); *H02J 3/381* (2013.01); *H02J 2300/24* (2020.01); *H02J 2300/28* (2020.01)

(58) Field of Classification Search
CPC .......... H02J 3/0073; H02J 3/001; H02J 3/381; H02J 2300/28; H02J 2300/24; H02J 3/00; H02J 3/38
See application file for complete search history.

(56) References Cited

U.S. PATENT DOCUMENTS

2019/0140477 A1* 5/2019 Yang .................... H02J 3/48

* cited by examiner

*Primary Examiner* — Robert L Deberadinis
(74) *Attorney, Agent, or Firm* — Foley & Lardner LLP

(57) ABSTRACT

The present disclosure describes a system that includes an energy source, a switching system, and a controller. The controller can be configured to receive, from a first REPP controller operating within a first REPP, an indication of an event at the first REPP; and responsive to receipt of the indication, adjust a switching position of the switching system to a first switching position to enable the energy source to provide energy to the first REPP and not any other REPP of the plurality of REPPs.

21 Claims, 10 Drawing Sheets

… (1)

SYSTEMS SOURCE ASSET BETWEEN RENEWABLE ENERGY POWER PLANTS

BACKGROUND

Several industrial applications may implement the use of an energy storage system ("ESS") for the use of storing, and later providing, electrical energy. An ESS may include one or more transformers that enable the ESS to distribute large amounts of energy across transmission lines. The ESS may be stored inside a renewable energy facility, in some cases with other renewable energy sources (RESs). For instance, the ESS and/or the RESs may be configured to power or energize equipment operating within the renewable energy facility to ensure the renewable energy facility remains operational. The ESS and/or the RESs can additionally be used to provide energy to an energy grid to distribute the energy to other loads connected to the energy grid.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

Figure 1A:
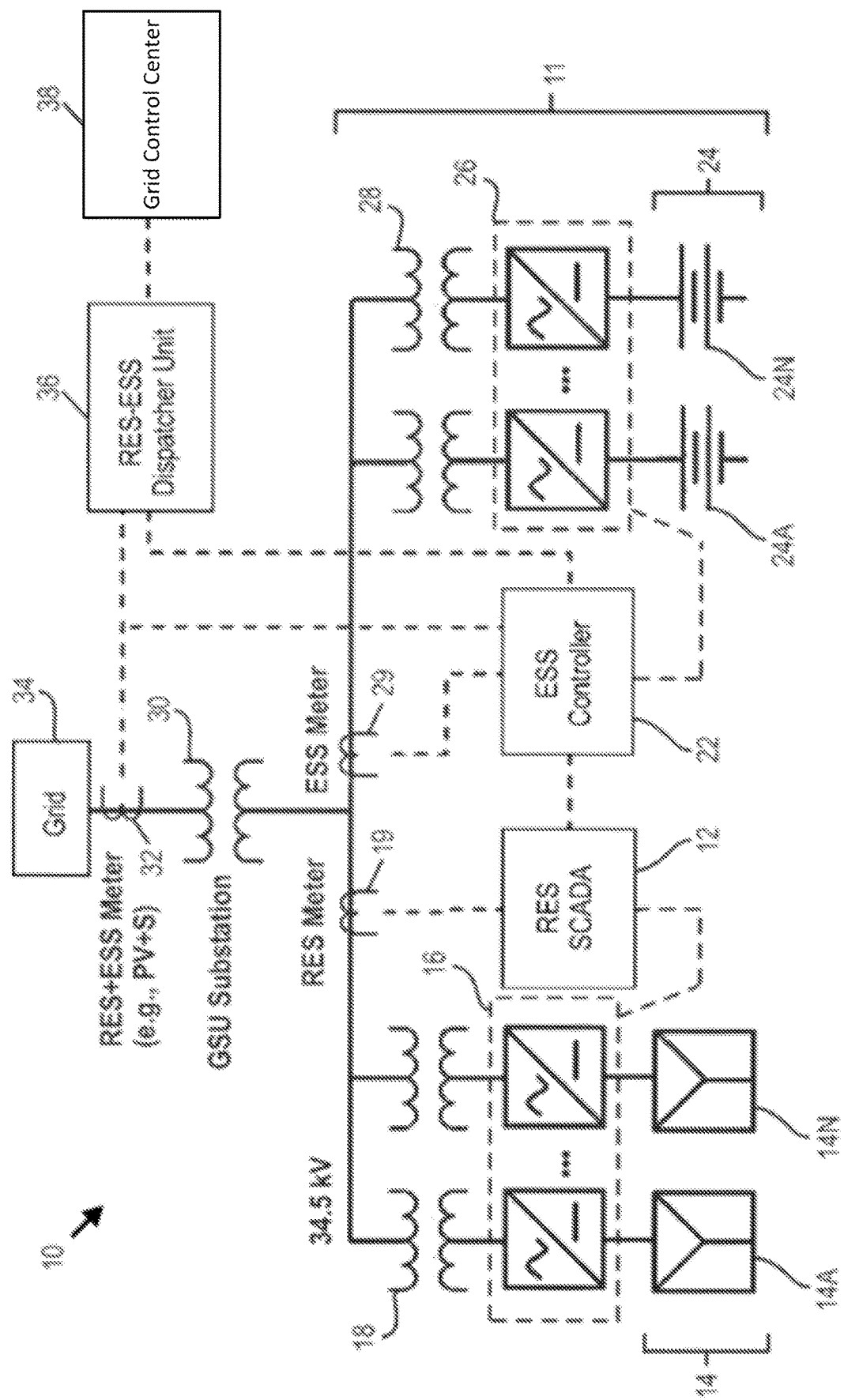
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

During operation, an ESS (e.g., a battery energy storage system (BESS) or any other type of energy storage system) of a renewable energy power plant (REPP) may malfunction or otherwise be turned off for maintenance. During these time periods, the ESS may experience a reduction in its ability to discharge energy to an energy grid or charge with energy from the energy grid. The ESS may additionally or instead experience a reduction in its ability to power other devices of the renewable energy power plant, such as heating, ventilation, and air equipment of the renewable energy power plant. Conventional techniques for addressing such problems may be to have a backup battery at the renewable energy power plant or to otherwise plan around such events (e.g., schedule maintenance for times in which the ESS is not scheduled to discharge energy to the energy grid and/or not scheduled to charge with energy from the energy grid). Such techniques can be costly given the high costs and space that may be required for backup batteries and/or may cause loads that are typically supplied with power from the energy grid to not receive power.

Additionally, renewable energy sources of a renewable energy power plant may operate inefficiently when supplying energy to loads internal to the renewable energy power plant and/or to an energy grid. For example, similar to an ESS, a renewable energy source may malfunction or may go down for maintenance during operation. During these events, the renewable energy source may not be able to provide energy to the energy grid or power devices within the renewable energy power plant. Additionally, given the limitations of equipment within the renewable energy power plant, in some cases, energy potentially generated by the renewable energy source may be clipped or curtailed. Each of these cases can reduce the amount of energy that the renewable energy source can provide to the energy grid and/or equipment within the renewable energy power plant.

Another technical problem that power plant designers and/or operators may face is the overprovisioning of capacity for multiple power plants as a whole. For example, in a conventional system, each power plant would need to have its own spare capacity. If there are multiple power plants, the sum of their spare capacity would likely be more than the spare capacity that is ever actually required given how rare it may be for any one power plant to call on its own spare capacity. It would be unusual for more than one power plant to call on its spare capacity simultaneously. Accordingly, when looked at as a whole, designing multiple power plants with spare capacity can imply overprovisioning of capacity for the power plants. However, because power plants are normally electrically isolated from each other (e.g., for regulation compliance purposes and/or because of hardware limitations), the power plants cannot share their spare capacities. Thus, power plants are often overbuilt with components that are larger and/or more expensive than necessary and may not be able to share any extra capacity with each other.

A processor implementing the systems and methods discussed herein may overcome the aforementioned technical deficiencies through a transferrable energy source asset. The transferrable energy source asset can be or include one or both of an ESS or an RES that is selectively connected to different renewable energy power plants. The transferrable asset can be configured to store and/or generate energy that can be directed to the different renewable energy power plants. The transferrable asset can be selectively coupled with the different renewable energy power plants through a switching system. The processor can control the switches within the switching system such that the transferrable asset can be charged with energy and/or discharge energy to one renewable energy power plant at a time. Accordingly, the processor can control the switches to enable the transferrable asset to operate as a backup energy source and/or energy storage device for different renewable energy power plants for different periods of time. This solution can enable a significant reduction in the amount of spare, standby, and/or backup capacity that is required by or built into multiple power plants.

The processor can control the transferrable asset to operate as a backup energy source and/or energy power supply when an ESS or an RES of the renewable energy power plant malfunctions, goes down for maintenance, experiences no-load losses, etc. For example, the processor can be in communication with controllers at renewable energy power plants that monitor the current state or conditions of the components within the respective renewable energy power plants. The processor can receive a message from one of the controllers indicating an ESS at the renewable energy power plant in which the controller operates is malfunctioning. In response to receiving the message, the processor can adjust the switching position of the switching system such that the transferrable asset is connected to the renewable energy power plant and can operate in place of the malfunctioning ESS. The transferrable asset can be charged and/or discharged to power the devices of renewable energy power plants and/or supply energy to the energy grid according to a charging/discharging schedule of the malfunctioning ESS. The processor can similarly adjust the switching position of the switching system to connect the transferrable asset with different renewable energy power plants over time to enable the transferrable asset to operate as a backup power source and/or power storage device for the different renewable energy power plants. In this way, the transferrable asset can operate to avoid requiring each of the multiple renewable energy power plants to have its own backup power supply and/or allow the renewable energy power plants to operate despite malfunctioning equipment.

In some cases (e.g., due to various state and/or federal regulations applicable to generation and wholesale sale of electricity and the operation of investor-owned utilities), energy cannot be intermingled between or among different power plants. To satisfy such constraints, the processor can be configured to ensure the transferrable asset does not have any stored energy before the transferrable asset is connected to a different renewable energy power plant. For example, through the switching system, the processor can connect the transferrable asset to a first renewable energy power plant in place of a malfunctioning ESS and/or RES at the first renewable energy power plant. The transferrable asset can be an ESS (e.g., a transferrable ESS). During the connection, the transferrable ESS can be charged with energy, such as energy from the energy grid or from a renewable energy source of the first renewable energy power plant. Subsequent to the connection, the processor can determine there is a malfunctioning ESS and/or RES at a second renewable energy power plant. In response to the determination and before adjusting the switching system to connect the transferrable ESS to the second renewable energy power plant, the processor can discharge or dissipate any energy that is still stored in the transferrable ESS that the transferrable ESS received from the first renewable energy power plant. Responsive to determining that the transferrable ESS has a state of charge of zero and/or that the transferrable ESS does not have remaining deliverable energy from the first renewable energy power plant, the processor can adjust the state of the switching system to connect the transferrable asset to the second renewable energy power plant so the transferrable ESS can operate in place of the malfunctioning ESS and/or RES at the second renewable energy power plant.

In some embodiments, instead of draining the ESS, the processor can monitor the amount of energy the ESS has discharged to a renewable energy power plant compared to the amount of energy the ESS has stored from the renewable energy power plant. In doing so, the processor can ensure the ESS does not discharge more energy than the ESS stores while connected with the renewable energy power plant. The processor can continue to control the switching system and/or transferrable ESS in this manner to enable different renewable energy power plants to operate without intermingling energy between the renewable energy power plants.

Energy Source Asset Transfer System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES–ESS facility 11 is shown, according to one embodiment. N can be any number. The N of the multiple generation units 14A-14N can be the same as or different from the N of the multiple energy storage units 24A-24N. The RES–ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES–ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34. In certain embodiments, the RES–ESS facility 11 may embody a DC coupled RES–ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., adsorbent media for releasably binding hydrogen, hydrogen storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller 22 may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast).

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
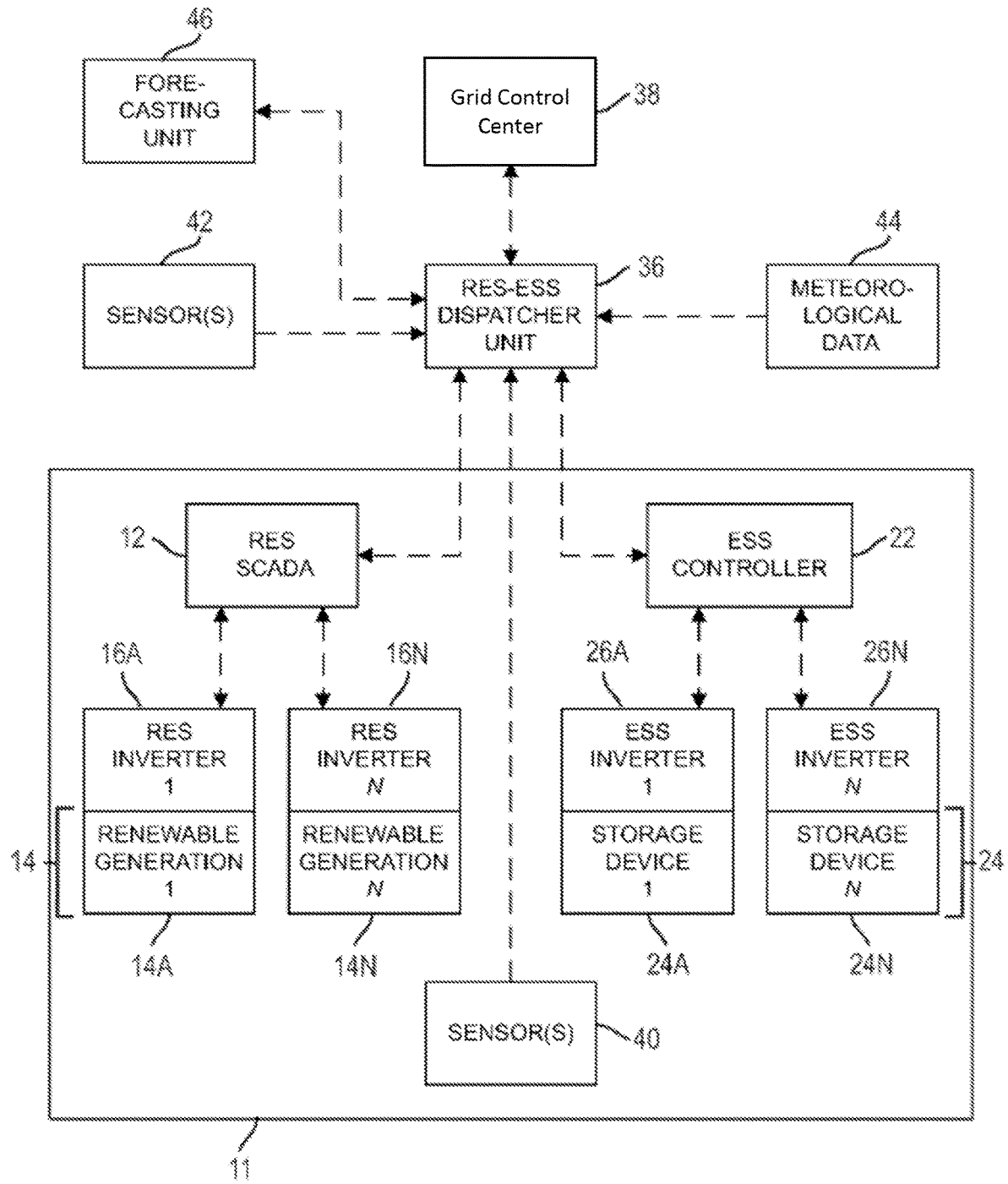
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 may further include at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
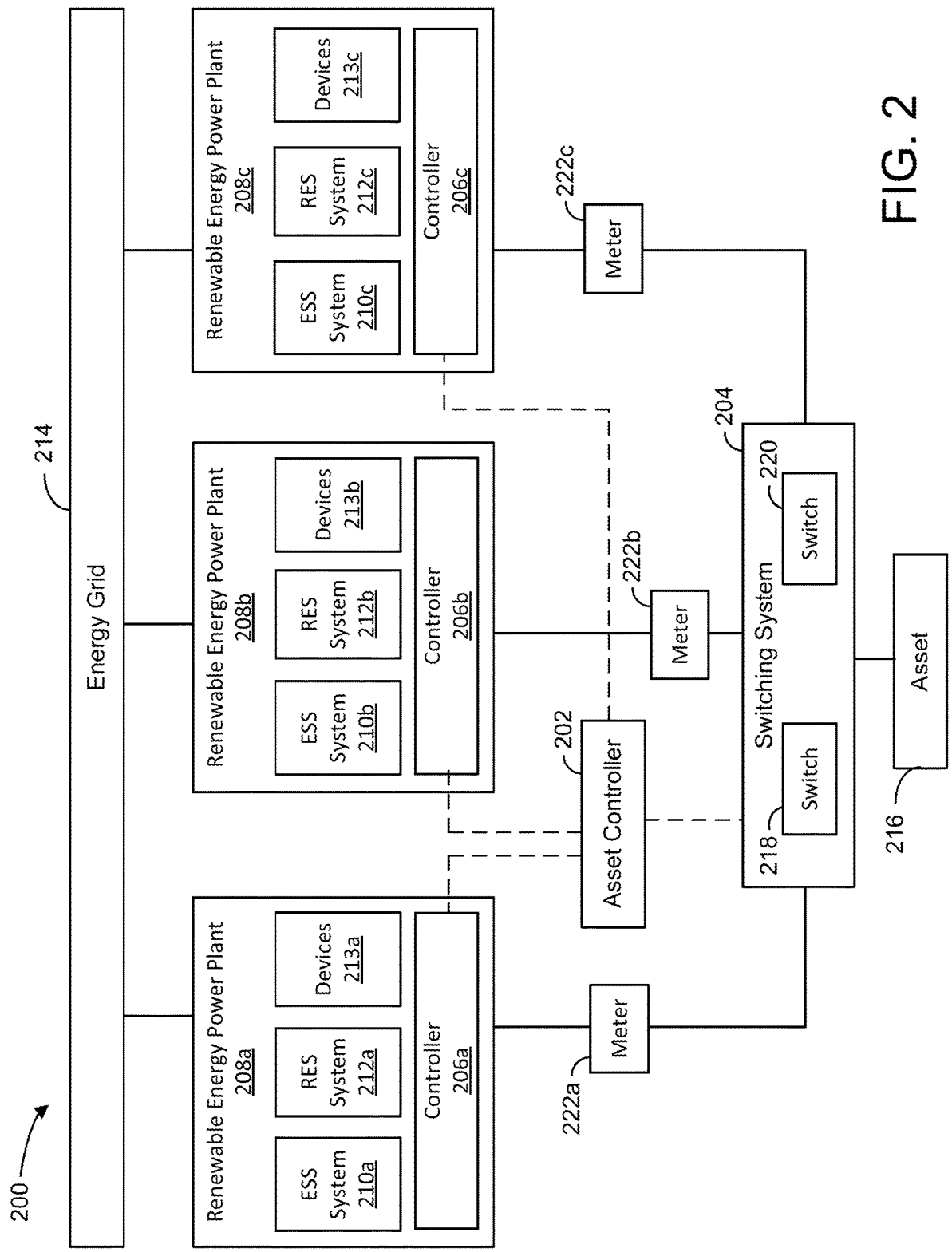
FIG. 2 illustrates an example system for transferring an energy source between renewable energy power plants, according to some embodiments.

Referring now to FIG. 2, a system 200 for transferring an energy source between renewable energy power plants is shown, in accordance with some embodiments of the present disclosure. As described herein, renewable energy facility and renewable energy power plant are used interchangeably. In brief overview, the system 200 can include an asset controller 202 that communicates with a switching system 204 and/or controllers 206a-c (individually, controller 206, and collectively, controllers 206). The controllers 206 can separately control and/or monitor equipment within renewable energy power plants 208a-c (individually, renewable energy power plant 208, and collectively, renewable energy power plants 208) of which the controllers 206 are a part. In doing so, the controllers 206 can respectively monitor and/or control ESS systems 210a-c (individually, ESS system 210, and collectively, ESS systems 210) and/or RES systems 212a-c (individually, RES system 212, and collectively, RES systems 212) of the respective renewable energy power plants 208. The renewable energy power plants 208 can discharge energy to an energy grid 214 and/or receive energy from the energy grid 214. The asset controller 202 can adjust the switching position of the switching system 204 such that an asset 216 (e.g., transferrable asset) can operate as an energy generation source and/or an energy storage device (e.g., separately or together, an energy source) for the different renewable energy power plants 208. The asset controller 202 can do so, for example, when an ESS or an RES of one of the renewable energy power plants 208 malfunctions or goes down for maintenance. The system 200 may include more, fewer, or different components than shown in FIG. 2. For example, there may be any number of client devices or computers that make up or are a part of the asset controller 202, any number of networks in the system 200, and/or any number of renewable energy power plants 208 in the system 200. As illustrated in the FIGS. described herein, dashed lines between components may indicate communication connections between devices. Solid lines can indicate physical electrical connections between devices.

The energy grid 214 can be a utility grid. The energy grid 214 can be similar to or the same as the grid 34, shown and described with reference to FIG. 1A. The energy grid 214 can be operated separately from the renewable energy power plants 208. The energy grid 214 can include a grid controller (e.g., a grid operator) that can communicate with the controllers 206 of the renewable energy power plants 208 to determine how much energy to receive from the renewable energy power plants 208 and/or discharge to the renewable energy power plants 208 over different time periods (e.g., according to different charging and/or discharging schedules or bids (e.g., accepted bids) for the renewable energy power plants 208). The energy grid 214 can be connected to other loads to distribute energy that the energy grid 214 receives from the different renewable energy power plants 208.

The renewable energy power plants 208 can be configured to store and/or generate energy. The renewable energy power plants 208 can store energy in the ESS system 210 of the respective renewable energy power plants 208 and generate energy with the RES systems 212 of the respective renewable energy power plants 208. The renewable energy power plants 208 can operate according to charging/discharging schedules that allow the renewable energy power plants 208 to meet the energy demands of different offtakers (e.g., entities with which the renewable energy power plants 208 have a power purchase agreement (PPA)) and/or the energy grid 214.

The individual ESS systems 210 can be or include an ESS with one or more energy storage devices (e.g., such as the energy storage device 24). The ESS system 210 can include inverters electrically coupled with the energy storage devices (e.g., the inverters 26). The ESS system 210 of a renewable energy power plant 208 can be configured to store energy that can be discharged to the energy grid 214 and/or to power the devices 213 of the renewable energy power plant 208.

The individual RES systems 212 can be or include one or more renewable energy sources (RESs), such as the energy generation devices 14. The renewable energy sources can be or include any type of renewable energy source, such as a solar energy source, a hydrogen energy source, a wind energy source, a hydroelectric energy source, etc. The RES systems 212 can include one or more inverters electrically coupled with the energy generation devices (e.g., the inverters 16). The RES system 212 of a renewable energy power plant 208 can be configured to generate energy that can be discharged to the energy grid 214 and/or to power the devices 213 of the renewable energy power plant 208.

The renewable energy power plants 208 can include devices 213a-c (individually and collectively, devices 213). The devices 213 can operate to maintain operation of the renewable energy power plants 208. The devices 213 may be or include one or more devices that operate within the renewable energy power plants 208. For example, the devices 213 may include heating, ventilation, and/or air equipment that operates to maintain a temperature setpoint of the renewable energy power plant 208 and/or an ESS of the ESS system 210. The devices 213 may additionally or instead include lights or any other machinery or devices that are connected to an electrical circuit within the renewable energy facility. The devices 213 may be a part of the respective ESS systems 210 and/or the RES systems 212 of the same renewable energy power plants 208. The devices 213 of an ESS system 210 may be powered by an ESS of the ESS system 210, in some embodiments. The devices 213 of an RES system 212 may be powered by one or more RESs of the RES system 212, in some embodiments.

The individual controllers 206 can be computers that are configured to monitor and control the various components of the respective renewable energy power plants in which the controllers 206 are located. The individual controllers 206 can monitor various sensors of renewable energy power plants 208 to determine the health and/or the status of the energy storage devices (e.g., the ESSs) of the ESS systems 210 and/or the energy generation units (e.g., the RESs) of the RES systems 212. Based on the sensor data, the controllers 206 can determine when there is an error in one of the ESS systems 210 and/or the RES systems 212 or when a component or device of the ESS systems 210 and/or the RES systems 212 is malfunctioning. A controller 206 can do so, for example, upon detecting a component is overheating or is no longer able to charge with energy or discharge energy. In some cases, the controllers 206 can be in communication with one or more devices of the ESS systems 210 and/or the RES systems 212. The controllers 206 can receive indications from the one or more devices indicating a malfunction or an error in the respective ESS systems 210 and/or RES systems 212. Upon determining such errors and/or malfunctions, a controller 206 can transmit a signal or message to the asset controller 202 indicating that there is an error or malfunctioning component (e.g., an event) at the renewable energy power plant 208 experiencing the error or malfunctioning component.

As described herein, an event can be any occurrence or detection that indicates a renewable energy power plant 208 cannot or is not operating properly, per standard procedure, and/or optimally. Events can be specific to problems that occur at ESSs and/or RESs of renewable energy power plants 208. Examples of events can include, but are not limited to, an error or malfunction at an ESS or RES, a maintenance period at an ESS or RES, an amount of curtailed energy that satisfies a condition (e.g., exceeds a threshold), a user input, no-load losses of devices powered by an ESS and/or one or more RESs, etc. Events can indicate for the asset 216 to connect with the renewable energy power plants 208 experiencing the events (e.g., ESSs and/or RESs of the renewable energy power plants 208 experiencing the events).

In some cases, a controller 206 of a renewable energy power plant 208 can determine when an ESS of an ESS system 210 and/or an RES of a RES system 212 is down for maintenance. The controller 206 can make such a determination based on a user input indicating the maintenance and/or based on a stored schedule indicating a time period for the maintenance. The controller 206 can maintain an internal clock and compare the clock (e.g., a time or value of the clock) to the time periods on the schedule. The controller 206 can determine an ESS and/or RES is down for maintenance based on the time on the internal clock being within a maintenance time period on the stored schedule.

The controllers 206 can transmit messages to the asset controller 202. The messages can indicate detected errors, malfunctioning devices, and/or maintenance periods (e.g., events) of the renewable energy power plants 208 in which the controllers 206 are located or otherwise configured to control. The messages can include identifications (e.g., alphanumerical strings or identifiers) of the renewable energy power plants 208 experiencing the errors, malfunctioning devices, and/or maintenance periods. In some embodiments, the messages can include identifications and/or descriptions of the errors, malfunctioning devices, and/or maintenance periods (e.g., events). In the case of errors or malfunctioning devices, the identifications or descriptions can identify what the error or malfunction is (e.g., overheated device, a disconnect, a short circuit, a device that will not power on, etc.) and/or the device or devices experiencing the error or malfunction. In some cases, the message may include an expected amount of time for the error to be resolved, which the controllers 206 may determine by identifying the error and identifying an expected amount of time to resolve such errors from memory, for example. In the case of maintenance periods, the messages may include an identification that maintenance is being performed, the devices on which the maintenance is being performed, and/or a time period for the maintenance. In some embodiments, the messages may include an indication of whether the error, malfunction, or maintenance is occurring in an ESS system 210 or a RES system 212 of a renewable energy power plant 208.

The asset 216 can be or include an ESS or an RES. In some cases, the asset 216 can include both an ESS and an RES. The asset 216 can be similar to or the same as one or more energy generation devices 14 and/or one or more energy storage devices 24, shown and described with reference to FIG. 1A. When the asset 216 includes an ESS, the asset 216 can be configured to store energy in the ESS, discharge energy from the ESS, and/or charge the ESS with energy. The asset 216 can be configured to do so by charging the ESS with energy received through the switching system 204 and/or by discharging energy from the ESS through the switching system 204. When the asset 216 includes an RES, the RES of the asset 216 can be configured to generate energy. The RES can store the generated energy in the ESS of the asset 216 and/or direct the energy through the switching system 204 to a renewable energy power plant 208. The asset 216 may include one or more inverters and/or transformers. The inverters and/or transformers can enable the asset 216 to provide energy to the energy grid 214 and/or to power devices within the renewable energy power plants 208.

The switching system 204 can be configured to selectively connect the asset 216 with the renewable energy power plants 208. The switching system 204 can be or include switches 218 and 220 and/or any number of switches. In some embodiments, the switching system 204 can include a controller that controls the switches 218 and 220 of the switching system 204. The controller can receive control signals from the asset controller 202 and operate the switches 218 and 220 according to the control signals. In some cases, the switching system 204 is a series of physical switches that are directly controlled by control signals from the asset controller 202 without a separate controller. The switching system 204 can connect (e.g., operationally couple) the asset 216 to a single renewable energy power plant 208 at a time such that energy is not distributed from one renewable energy power plant 208 to another renewable energy power plant 208 through the switching system 204 (e.g., to comply with jurisdictional regulations, if any). The switching system 204 can receive output energy from the renewable energy power plant 208 to which the switching system 204 is coupling the asset 216 and charge the asset 216 with the output energy and vice versa. The switching system 204 can similarly receive energy from the asset 216 and direct the received energy to the renewable energy power plant to which the switching system 204 is coupled. Doing so can enable the asset 216 to operate in place of the malfunctioning RES and/or ESS at the renewable energy power plant 208, such as to meet the energy demands of the energy grid 214 and/or to otherwise satisfy a commitment to the energy grid 214 or an offtaker.

The switches 218 and 220 can be or include any type of switch or switching mechanism. For example, the switches 218 and 220 can be or include physical switches that physically connect the asset 216 with different renewable energy power plants 208. In another example, the switches 218 can be or include power flow devices. As described herein, a power flow device can be a device that controls the flow of power or energy to or from the asset 216 to the different renewable energy power plants 208. Examples of power flow devices can include inverters, AC-to-AC converters, DC-to-DC converters, etc. The individual switches 218 and 220 can be configured to selectively connect the asset 216 to individual renewable energy power plants 208. For example, the switch 218 can be configured to operate in two states, a first state, or a connected state, in which the switch 218 facilitates energy transfer between the asset 216 and the renewable energy power plant 208a, and a second state, or a disconnected state, in which the switch 218 is disconnected or is otherwise configured or positioned to not facilitate energy transfer between the asset 216 and the renewable energy power plant 208. The switch 220 can similarly be configured to connect or disconnect the asset 216 from the renewable energy power plant 208b. The switching system 204 can include any number of such switches that can connect or disconnect the asset 216 from any number of renewable energy power plants 208.

The switching system 204 can be controlled to be in different switching positions. A switching position can be or indicate a state of the switches (e.g., the switches 218 and 220) within the switching system 204. Each switching position can indicate a different permutation or combination of the states of the switches of the switching system 204. For example, in a first switching position, the switch 218 can be in a connected state to connect the asset 216 with the renewable energy power plant 208a. Each other switch of the switching system 204 can be disconnected in the first switching position. In a second switching position, the switch 218 can be in a connected state to connect the asset 216 with the renewable energy power plant 208b. Each other switch of the switching system 204 can be disconnected in the second switching position. Any number of switches can be in a connected state in a switching position. The switching system 204 can be configured to be in each permutation or combination of switching positions in which one or more of the switches of the switching system 204 are in a connected state with a renewable energy power plant 208.

In some embodiments, the switching system 204 may be configured such that only one switch of the switching system 204 can be in a connected state at a time (e.g., such that the asset 216 is only connected with one renewable energy power plant 208 at a time). Such may be the case, for example, in jurisdictions where intermingling of energy between renewable energy power plants 208 is restricted or otherwise when agreements restrict such intermingling. Because energy can flow to and from the asset 216, multiple connections at once may enable or cause energy to be transferred between renewable energy power plants 208. By only connecting the asset 216 to one renewable energy power plant 208 at a time, the switching system 204 may avoid intermingling of energy between such renewable energy power plants 208.

In some embodiments, the switching system 204 can be in a switching position in which the asset 216 is connected to multiple renewable energy power plants 208. In such embodiments, the switching system 204 can connect or activate multiple switches between the asset 216 and the multiple renewable energy power plants 208. In doing so, the switching system 204 can operate to enable the asset 216 to operate as a backup power supply and/or storage device for multiple renewable energy power plants 208 at once, in some cases enable energy transfer between renewable energy power plants 208.

The system 200 can include meters 222a-c (individually meter 222 and collectively meters 222). The meters 222 can be connected between the switching system 204 and respective renewable energy power plants 208. The meters 222 may each be or include an energy meter that is configured to read the amount of energy that is provided from the asset 216 to the respective renewable energy power plants 208. The meter 222 may generate positive readings when energy is flowing to the renewable energy power plants 208 from the asset 216 and negative values when the meters 222 read or measure energy flowing from the respective renewable energy power plants 208 to the asset 216, or vice versa. The meters 222 may be similar to the RES electrical power meter 19 or the ESS electrical power meter 29, shown and described with reference to FIG. 1A.

The asset controller 202 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The asset controller 202 can include or utilize at least one processing unit or other logic device such as a programmable logic array engine or a module configured to communicate with one another or other resources or databases. The components of the asset controller 202 can be separate components or a single component. The asset controller 202 and its components can include hardware elements, such as one or more processors, logic devices, or circuits.

The asset controller 202 may comprise one or more processors that are configured to monitor the different renewable energy power plants 208 and/or control the switching position of the switching system 204. The asset controller 202 may comprise a communications interface, a processor, and/or memory. The asset controller 202 may communicate with the controllers 206 and/or the switching system 204 via the communications interface, as is illustrated by the dashed lines in FIG. 2. In some cases, the asset controller 202 can communicate with the different components via an application programming interface (API). The processor of the asset controller 202 may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in the memory of the asset controller 202 to facilitate the activities described herein. The memory may be any volatile or non-volatile computer-readable storage medium capable of storing data or computer code. The memory may be or include non-transitory memory.

In brief overview, the asset controller 202 may operate to monitor the state of the energy storage equipment and/or energy generation equipment at the different renewable energy power plants 208. The asset controller 202 can determine when there is a malfunction at one of the renewable energy power plants and/or otherwise when to adjust the switching position of the switching system 204. In some embodiments, the asset controller 202 can adjust the switching position of the switching system 204 such that the asset 216 is only connected or operationally coupled with a single renewable energy power plant 208 experiencing an event at a time to operate as an energy source and/or energy storage device for the single renewable energy power plant 208. The asset controller 202 can adjust the switching position of the switching system 204 over time to connect the asset 216 to different renewable energy power plants 208 in a similar manner. In some cases, the asset controller 202 can discharge the asset 216 between changes in switching position to avoid intermingling energy between the different renewable energy power plants 208.

The asset controller 202 may store, in memory, programmable instructions that, upon execution, cause a processor of the asset controller 202 to monitor the renewable energy power plants 208 and control energy distribution of the asset 216 between the different renewable energy power plants 208. For example, the asset controller 202 can be configured to monitor the renewable energy power plants 208. The asset controller 202 can monitor the renewable energy power plants 208 by polling or by otherwise communicating with the controllers 206 of the renewable energy power plants 208. For example, the asset controller 202 can establish communication sessions and/or connections with the controllers 206 of the renewable energy power plants 208. The communication sessions and/or the messages transmitted over the communication sessions are represented by the dashed lines in FIG. 2. Over the communication sessions, the controllers 206 can transmit messages to the asset controller 202 indicating the status or state of the devices of components of the renewable energy power plants 208 that the controllers 206 respectively control. The messages can include indications of errors, malfunctioning devices, maintenance periods, or other events occurring at the respective renewable energy power plants 208.

In some embodiments, the controllers 206 can transmit the messages to the asset controller 202 responsive to detecting an error, malfunction, a maintenance period, or other event at the renewable energy power plants 208 controlled by the controllers 206. For example, a controller 206 can detect an ESS of an ESS system 210 is not charging properly. Responsive to the detection, the controller 206 can transmit a message to the asset controller 202 indicating the malfunctioning ESS. The controller 206 can similarly transmit messages to the asset controller 202 responsive to any type of error or malfunctioning equipment or responsive to detecting a maintenance period. The messages can include or be indications to provide energy to the renewable energy power plants 208 of the controllers 206 that transmit the messages.

In some embodiments, the controllers 206 can transmit the messages to the asset controller 202 responsive to receiving a message from the asset controller 202. For example, the controllers 206 can detect errors, malfunctioning equipment, and/or maintenance periods (e.g., active maintenance periods) at the renewable energy power plants 208 controlled by the controllers 206. Upon doing so, the controllers 206 can store identifications and/or descriptions of the errors, malfunctioning equipment, and/or maintenance periods in memory. The asset controller 202 can poll the controllers 206 pseudo-randomly or at set time intervals requesting the status of the individual renewable energy power plants 208. Upon receiving the requests, the controllers 206 can query memory (e.g., memory of the respective controllers 206) to determine if there are any current errors, malfunctioning equipment, and/or maintenance periods to include in a message to the asset controller 202. The controllers 206 can respond to such queries with messages including such identifications and/or descriptions if there are any stored in memory or with indications that the renewable energy power plants 208 are operating normally if there are not any identifications and/or descriptions stored in memory. The asset controller 202 can detect an error, malfunction, or maintenance period at a renewable energy power plant 208 responsive to receiving a message from a controller 206 of the renewable energy power plant 208 indicating the error, malfunction, or maintenance period.

In some embodiments, the asset controller 202 can detect errors, malfunctioning equipment, and/or maintenance periods (e.g., events) at a renewable energy power plant 208 directly (e.g., without communicating with a controller 206 at the renewable energy power plant 208). For example, the asset controller 202 can monitor sensors or communicate with devices at the different renewable energy power plants 208 to determine errors or malfunctioning equipment at the renewable energy power plants 208. The asset controller 202 can do so in a similar manner to how the controllers 206 can monitor and/or communicate with the devices of the renewable energy power plant 208. In another example, the asset controller 202 can store maintenance schedules (e.g., data files containing time periods for maintenance) for the individual renewable energy power plants 208. Each maintenance schedule can correspond with (e.g., include) an identifier of the renewable energy power plant 208 to which the maintenance schedule pertains. The asset controller 202 can maintain an internal clock and compare the internal clock (e.g., compare a current value or time of the internal clock) with the different maintenance schedules. The asset controller 202 can identify a maintenance schedule that includes a time period for maintenance that includes the current time on the internal clock. The asset controller 202 can identify the identifier of the renewable energy power plant 208 from the maintenance schedule to determine the renewable energy power plant 208 that is associated with or undergoing maintenance.

Responsive to determining a renewable energy power plant 208 is experiencing an error, malfunctioning, a maintenance period, or another event, the asset controller 202 can determine a switching position for the switching system 204. The asset controller 202 can do so, for example, by identifying a switching position in which the asset 216 is connected or otherwise operationally coupled with the renewable energy power plant 208. For example, the asset controller 202 can store configurations for different switching positions in memory. Each switching position may correspond to a different switch connecting or operationally coupling the asset 216 with a different renewable energy power plant 208. The asset controller 202 can identify a switching position (e.g., a first switching position) in which a switch is in a connected state between the asset 216 and the renewable energy power plant 208 experiencing an error, malfunctioning, or otherwise undergoing a maintenance period from memory. In some cases, the switch connecting the asset 216 and the renewable energy power plant 208 experiencing an error, malfunctioning, a maintenance period, or another event is the only switch in the connected state to avoid connecting different renewable energy power plants 208 together.

The asset controller 202 may transmit control signals to or otherwise control the switching system 204. The asset controller 202 can transmit control signals to the switching system 204 to change or adjust the state, positioning, or configurations of the switches (e.g., the switches 218 and 220) of the switching system 204. The asset controller 202 can transmit control signals to the switching system 204 to cause the switching system 204 to be in the switching position that the asset controller 202 selected from memory. For example, the asset controller 202 can select the first switching position in which the switch 218 connects (e.g., is closed) the asset 216 with the renewable energy power plant 208a and the switch 220 and any other switches of the switching system are disconnected (e.g., are open). The asset controller 202 can transmit a control signal to the switching system 204 to cause the switches of the switching system 204 to be in the first switching position. The switching system 204 can receive the control signal and change position to direct energy output from the asset 216 to the renewable energy power plant 208a and not any other renewable energy power plants 208 in accordance with the switching positions of the control signal. In doing so, the asset controller 202 can enable the asset 216 to provide energy to the renewable energy power plant 208a and not any other renewable energy power plants 208.

In embodiments in which the switches of the switching system 204 are power flow devices, the switching positions in memory may correspond to whether the power flow devices are in an "on" state or an "off" state. For example, the asset controller 202 can determine to connect the asset 216 to the renewable energy power plant 208a through the switch 218, which may be a power flow device. To adjust the state of the switching system 204 to the switching position in which the asset 216 is connected with the renewable energy power plant 208a, the asset controller 202 can transmit a control signal to the switching system 204 to cause the power flow device connecting the asset 216 with the renewable energy power plant 208a to turn on (e.g., to be active or activated). The asset controller 202 can additionally or instead transmit control signals to each other power flow device of the switching system 204 to ensure each other power flow device is in the off state (e.g., to be inactive or deactivated). Accordingly, the asset controller 202 can control the power flow devices of the switching system 204 to enable the asset 216 to provide power to specific renewable energy power plants 208 through a single active power flow device at a time and not through the inactive power flow devices.

In the first switching position, the asset 216 can operate in place of or in combination with the ESS system 210. For example, the asset 216 can operate to provide energy to the devices 213a of the renewable energy power plant 208 while the ESS system 210, or an ESS of the ESS system 210, is malfunctioning. An ESS of the asset 216 can charge with energy from the energy grid 214 and/or an RES of the asset 216 can generate and direct energy through the switch 218 to power the devices 213a. In some cases, the RES of the asset 216 can charge the ESS of the asset 216 with energy the RES generates. The ESS and/or the RES of the asset 216 can direct energy to the devices 213a to power the devices 213a (e.g., power the devices 213a in place of or in conjunction with the ESS of the ESS system 210a that is malfunctioning). The asset 216 can additionally charge and/or discharge according to a charging/discharging schedule under which the malfunctioning ESS or ESS system 210a would have operated. The asset 216 can include an ESS that, according to the charging/discharging schedule, charges with energy from the energy grid 214 and discharges energy to the energy grid 214 to provide energy to the energy grid 214 and/or to any offtaker to which the renewable energy power plant 208a committed to provide energy.

The asset controller 202 can adjust the configuration of the switching system 204 to change the renewable energy power plants 208 to which the asset 216 provides energy over time. For example, subsequent to connecting the asset 216 with the renewable energy power plant 208*a*, the asset controller 202 can receive a message from the controller 206*b* indicating to provide energy to the renewable energy power plant 208*b* (e.g., indicating that there is an error, malfunctioning device, or a maintenance period at the renewable energy power plant 208*b*). The asset controller 202 can receive the message and determine a switching position (e.g., a second switching position) for the switching system 204 to connect the asset 216 with the renewable energy power plant 208*b* (e.g., disconnect the asset 216 from the renewable energy power plant 208*a* and connect the asset 216 with the renewable energy power plant 208*b*). The asset controller 202 can transmit a control signal to the switching system 204 to adjust the switching position of the switching system 204 from the first switching position to the second switching position. In the second switching position, the asset 216 can operate in place of or in combination with any RES or ESS of the renewable energy power plant 208*b* experiencing the error, malfunction, or maintenance period.

In some embodiments, the asset controller 202 can drain the asset 216 of stored energy prior to connecting the asset 216 with the renewable energy power plant 208*b*. For example, the asset 216 may be or include an ESS (e.g., a transferrable ESS). Responsive to receiving the message from the controller 206*b* or otherwise detecting an event at the renewable energy power plant 208*b*, the asset controller 202 can determine the state of charge of the ESS of the asset 216. The asset controller 202 can determine the state of charge of the ESS of the asset 216 using one or more sensors (e.g., a voltmeter or a joulemeter). The asset controller 202 can determine the state of charge is not zero or otherwise exceeds a threshold (e.g., a predetermined threshold). Responsive to the determination, the asset controller 202 can drain or discharge energy from the ESS of the asset 216 until the state of charge of the ESS of the asset 216 is zero (e.g., discharge all of the energy from the ESS) or below the threshold. Responsive to determining the state of charge of the ESS of the asset 216 is zero or below the threshold, the asset controller 202 can adjust the switching position of the switching system 204 to be in the second switching position in which the asset 216 is connected with the renewable energy power plant 208*b* (e.g., and not any other renewable energy power plants 208). Accordingly, the asset controller 202 can control the energy distribution by the asset 216 to avoid intermingling energy from one renewable energy power plant 208 to another renewable energy power plant 208.

In some embodiments, the asset controller 202 can use the meters 222 to avoid intermingling energy between renewable energy power plants 208. For example, prior to connecting the asset 216 with the renewable energy power plant 208*b* and subsequent to connecting the asset 216 with the renewable energy power plant 208*a*, the asset controller 202 can identify the current state of charge of the asset 216 (e.g., the current state of charge of an ESS of the asset 216). The asset controller 202 can connect the asset 216 to the renewable energy power plant 208*b* by adjusting the switching position of the switching system 204 to the second switching position. The asset controller 202 can do so regardless of the state of charge of the asset 216. When the switching system 204 is in the second switching position, the asset 216 can discharge energy to the renewable energy power plant 208*b* and/or charge with energy from the renewable energy power plant 208*b*. While the asset 216 does so, the asset controller 202 can monitor the measurements or energy readings of the meter 222*b* measuring the energy transfer to and from the asset 216 (e.g., for a period of time in which the switching system 204 is connected with the renewable energy power plant 208*b*). Based on the readings, the asset controller 202 can ensure the meter 222*b* does not indicate that the asset 216 does not discharge more energy than the asset 216 has received through the renewable energy power plant 208*b* (e.g., from the energy grid 214) during the period of time in which the switching system 204 is connected with the renewable energy power plant 208*b*. Responsive to determining the asset 216 has discharged more energy than the asset 216 has received (e.g., for the period of time), the asset controller 202 can communicate with the asset 216 (e.g., a power flow device of the asset 216) to stop discharging energy to the renewable energy power plant 208*b* and/or adjust the switching position of the switching system 204 to disconnect the asset 216 from the renewable energy power plant 208*b* and/or require the switching position of the switching system 204 to keep the asset 216 connected to the renewable energy power plant 208*b* until such time as charging of the asset 216 from the renewable energy power plant 208*b* has offset the excess discharge amount.

In some embodiments, in providing energy to a renewable energy power plant 208, the asset 216 can direct energy to a bus connected to an ESS system 210 of the renewable energy power plant 208. For example, the asset 216 can be or include an ESS (e.g., a transferrable ESS). The switching system 204 can be configured to connect the asset 216 with a bus of the renewable energy power plant 208 that connects a malfunctioning ESS of the ESS system 210 to the energy grid 214 and/or devices within the ESS system 210. In some cases, the controller 206 of the renewable energy power plant 208 or the asset controller 202 may disconnect the malfunctioning ESS from the same bus. Accordingly, when the asset controller 202 adjusts the switching system 204 to connect the asset 216 with the renewable energy power plant 208, the asset 216 can provide energy to devices that the malfunctioning ESS of the ESS system 210 would have otherwise powered and/or to the energy grid 214 that the malfunctioning ESS of the ESS system 210 would have otherwise provided energy. Additionally, the asset 216 can receive energy from the energy grid 214 that the malfunctioning ESS of the ESS system 210 would have otherwise received for charging. Connecting to the same bus as the ESS can enable the asset 216 to operate as a replacement and/or backup to the ESS when the ESS is experiencing an error, malfunctioning, or otherwise going through a maintenance period.

In some embodiments, in providing energy to a renewable energy power plant 208, the asset 216 can direct energy to a bus connected to an RES system 212 of the renewable energy power plant 208. For example, the asset 216 can be or include an RES (e.g., a transferrable RES). The switching system 204 can be configured to connect the asset 216 with a bus of the renewable energy power plant 208 that connects a malfunctioning RES of the RES system 212 to the energy grid 214 and/or devices within the RES system 212. Accordingly, when the asset controller 202 adjusts the switching system 204 to connect the asset 216 with the renewable energy power plant 208, the asset 216 can provide energy to devices that the malfunctioning RES of the RES system 212 would have otherwise powered and/or to the energy grid 214 that the malfunctioning RES of the RES system 212 would have otherwise provided. Connecting to the same bus as the RES can enable the asset 216 to operate as a replacement and/or backup to the RES when the RES is experiencing an error, malfunctioning, or otherwise going through a maintenance period.

In some embodiments, the asset 216 can operate as a backup energy storage device for an RES system 212. For example, a renewable energy power plant 208 may be or include an RES (e.g., a first RES) of an RES system 212 that generates energy over time. The RES can be or include a solar power generation device. The controller 206 of the renewable energy power plant 208 can be configured to limit the amount of energy that the RES can generate at any given time. The controller 206 can monitor the amount of energy that the RES is curtailing or clipping over time. The controller 206 can compare the amount of energy that the RES is curtailing or clipping over time to one or more conditions. Responsive to determining the amount of energy that the RES is curtailing or clipping satisfies a condition, the controller 206 can transmit a message to the asset controller 202 indicating to connect with the renewable energy power plant 208 (e.g., connected with a bus common to the RES). The controller 206 can stop curtailing the energy being generated by the RES and instead store the generated energy in the asset 216. Thus, the asset 216 can operate as a backup energy storage device to avoid wasting generated energy.

The one or more conditions to which the controller 206 can compare the amount of curtailed energy can include different conditions. In one example, the one or more conditions can include a condition that is satisfied when there is any amount of curtailed energy for an RES. In another example, the one or more conditions can include a condition that is satisfied when an amount of curtailed energy exceeds a threshold (e.g., a defined threshold). In another example, the one or more conditions can include a condition that is satisfied when an amount of curtailed energy exceeds a threshold (e.g., the same threshold) for a duration (e.g., a defined duration) of time. The controller 206 can compare the amounts of curtailed energy of different RESs to the one or more conditions over time and determine a condition is satisfied once the criteria of the condition are met.

In some embodiments, the asset controller 202 can address no-load losses that may occur at different renewable energy power plants 208. For example, when an ESS of a renewable energy power plant 208 is not discharging energy to the energy grid 214 or receiving energy from the energy grid 214, the ESS may be considered to be in standby mode. In such cases, the ESS may power the devices 213 of the ESS system 210 of the ESS. In doing so, the ESS may not have enough energy to adequately power the devices 213 of the ESS system 210. To avoid using energy from the energy grid 214 to power the devices 213 when this occurs, the asset controller 202 can adjust the switching position of the switching system 204 to connect the asset 216 with the renewable energy power plant 208 (e.g., with the bus of the ESS system connected to the devices the ESS is not adequately powering). The asset controller 202 can connect the asset 216 with the renewable energy power plant 208 in response to detecting that the ESS is not discharging energy to the energy grid 214 or receiving energy from the energy grid 214 and/or in response to receiving a message indicating an event at the ESS from the controller 206 of the renewable energy power plant 208 that detects the same. The asset 216 may operate to power the devices. The asset controller 202 and/or the controller 206 of the renewable energy power plant 208 may monitor a meter measuring the amount of energy being transferred from the energy grid 214 to power the devices 213 of the ESS system 210. The asset controller 202 and/or the controller 206 (e.g., by communicating with the asset controller 202) can control energy discharge of the asset 216 to cause the value read by the meter to be at or otherwise approach zero over time. Responsive to determining the meter is measuring a positive value (e.g., responsive to determining the asset 216 is discharging energy to the energy grid 214), the asset controller 202 can adjust the switching system position of the switching system to stop discharging energy to the renewable energy power plant 208. The method of controlling a transferrable asset (e.g., a transferrable ESS and/or transferrable RES) to reduce no-load losses is described in more detail in U.S. patent application Ser. No. 18/326,203, filed May 31, 2023, the entirety of which is incorporated by reference herein.

In some embodiments, the asset controller 202 can connect the asset 216 with different renewable energy power plants 208 according to an optimization function. For example, over time, the asset controller 202 can monitor the energy requirements of the devices 213 of the different renewable energy power plants 208. The asset controller 202 can also determine (e.g., by communicating with the controllers 206 of the renewable energy power plants 208) the values of the energy that the different renewable energy power plants 208 provide to the energy grid 214. The asset controller 202 can determine a score for each of the renewable energy power plants 208 based on the amount of energy that the devices 213 of the renewable energy power plants 208 need to operate, based on the values (e.g., prices) of energy provided by the renewable energy power plants 208 to the energy grid 214 over time, and/or based on the amount of energy the renewable energy power plants 208 are predicted to generate for a specific time period. The asset controller 202 can determine the score for each of the renewable energy power plants 208 as a function of the value of the energy provided by the renewable energy power plant 208 to the energy grid 214, the energy requirements of the devices 213 of the renewable energy power plant 208, and/or the amount of energy the renewable energy power plants 208 are predicted to generate. The function can be an average, a sum, a weighted sum, a median, etc. The scores can be determined based on any metrics of generation and/or storage.

The asset controller 202 can use the scores for the renewable energy power plants 208 to determine which renewable energy power plant 208 to connect with the asset 216 through the switching system 204. For example, the asset controller 202 can compare the scores of the renewable energy power plants 208. The asset controller 202 can identify the renewable energy power plant 208 with a score that satisfies a condition, such as having the highest score of the renewable energy power plants 208 connected with the asset 216 through the switching system 204. Responsive to determining a score (e.g., a second score) for a renewable energy power plant (e.g., a second renewable energy power plant) satisfies a condition, the asset controller 202 can adjust the switching position of the switching system 204 to connect the asset 216 with the renewable energy power plant 208 to enable the asset 216 to operate as a backup energy storage device and/or energy source. The asset controller 202 can continually perform this optimization function and adjust the switching position of the switching system 204 over time to optimize the energy production and storage of different renewable energy power plants 208.

The asset controller 202 can use the optimization function to determine which renewable energy power plants 208 to connect with the asset 216 during time periods in which the asset controller 202 has not connected the asset 216 with a renewable energy power plant 208 for other purposes, such as to replace or assist a malfunctioning ESS or RES or an ESS or RES that is down for maintenance. The asset controller 202 can determine the asset 216 is not currently connected with any renewable energy power plants, such as based on identifying a current switching position of the switching system 204, and perform the optimization function to connect the asset 216 to a renewable energy power plant 208. In such cases, the asset controller 202 can automatically adjust the switching position of the switching system 204 to connect the asset 216 with a different renewable energy power plant 208 responsive to determining the renewable energy power plant 208 is undergoing maintenance or experiencing an error or malfunctioning. Thus, the asset controller 202 can enable the asset 216 to operate to optimize performance of different renewable energy power plants 208 while being on call to operate as a backup energy generation source or energy storage device.

In some embodiments, the asset controller 202 can use the optimization functions to select which renewable energy power plant 208 to connect with the asset 216 when multiple renewable energy power plants 208 are malfunctioning, undergoing maintenance, or are otherwise experiencing an event. For example, the asset controller 202 can determine each of the renewable energy power plants 208a and 208b have an ESS that is currently malfunctioning. Responsive to the determination, the asset controller 202 can execute the optimization algorithm to determine scores only for the renewable energy power plants 208a and 208b. The asset controller 202 can compare the two scores and connect the asset 216 to the renewable energy power plant 208 that is associated with the highest score. Thus, the asset controller 202 can optimize the renewable energy power plants 208 to provide the asset 216 as a backup energy source or energy storage device.

In some embodiments, such as when contractual and/or jurisdictional regulations allow for it, the asset controller 202 can connect the asset 216 to multiple renewable energy power plants 208 at once. For example, the asset controller 202 can determine or detect events at multiple renewable energy power plants 208 at once or within the same time period. In one example, the renewable energy power plant 208a can experience no-load losses and the renewable energy power plant 208b can experience a malfunctioning ESS. Responsive to detecting multiple events at once, the asset controller 202 can determine a switching position for the switching system 204 that causes the asset 216 to be connected with multiple renewable energy power plants 208. The switching position can connect the asset 216 to the renewable energy power plants 208 experiencing an event or several events and not any other renewable energy power plants 208. The asset controller 202 can adjust the switching position of the switching system 204 according to the determined switching position, such as by transmitting a control signal to the switching system 204.

In some embodiments, such as when contractual and/or jurisdictional regulations allow for it, the asset controller 202 can connect the asset 216 to different ESS buses and/or RES buses at the same time. The ESS buses and/or the RES buses can be buses of the same renewable energy power plant 208 and/or different renewable energy power plants 208. For example, the asset controller 202 can detect an event at an ESS of the renewable energy power plant 208a, an RES of the renewable energy power plant 208a, and an ESS of the renewable energy power plant 208b. Responsive to doing so, the asset controller 202 can determine a switching position of the switching system 204 that connects the asset 216 with the ESS buses of the renewable energy power plants 208a and 208b and the RES bus of the renewable energy power plant 208a. The switching position may cause the asset 216 not to be connected with any other renewable energy power plants 208 or buses of renewable energy power plants 208. When the switching system 204 is in this switching position, the asset 216 can operate as a backup power supply or power generation source in place of or in conjunction with the ESSs and/or the RES experiencing the event.

The asset controller 202 can control the switching system 204 to remain in the same switching position connecting the asset 216 with a renewable energy power plant 208 until determining the renewable energy power plant 208 is no longer experiencing an event. For example, the asset controller 202 can adjust the switching position of the switching system 204 to connect the asset 216 with the renewable energy power plant 208a responsive to determining the renewable energy power plant 208a is experiencing an event. The switching system 204 can remain in this switching position until the asset controller 202 determines the renewable energy power plant 208a is no longer experiencing the event. The asset controller 202 can determine the renewable energy power plant 208a is no longer experiencing the event responsive to receiving a message from the controller 206 indicating the event is over and/or responsive to detecting the event is over from sensor data of the renewable energy power plant 208a. Responsive to determining the renewable energy power plant 208a is no longer experiencing the event, the controller 206 can adjust the switching position of the switching system 204. In some embodiments, the asset controller 202 may leave the switching system 204 in the same switching position until the asset controller 202 detects an event at another renewable energy power plant 208, at which point the asset controller 202 can determine and adjust the switching position of the switching system 204 to connect the asset 216 with the new renewable energy power plant 208 experiencing the event.

In some cases, responsive to determining the renewable energy power plant 208 is no longer experiencing the event, the renewable energy power plant 208 can determine a new switching position for the switching system 204. The asset controller 202 can determine the new switching position to be a standard or standby switching position in which the asset 216 is no longer connected with any of the renewable energy power plants 208 or can determine one or more other renewable energy power plants 208 to connect with the asset 216. For example, responsive to determining the event at the renewable energy power plant 208a is over, the asset controller 202 can identify a switching position from memory that corresponds with the asset 216 not being connected with any renewable energy power plants 208. In another example, responsive to determining the event at the renewable energy power plant 208a is over, the asset controller 202 can execute the optimization function to determine a switching position for one or more renewable energy power plants 208 to optimize energy generation and/or storage. The asset controller 202 can use any technique to determine the new switching position for the switching system 204. The asset controller 202 can adjust the switching system 204 according to the determined switching position.

Figure 3:
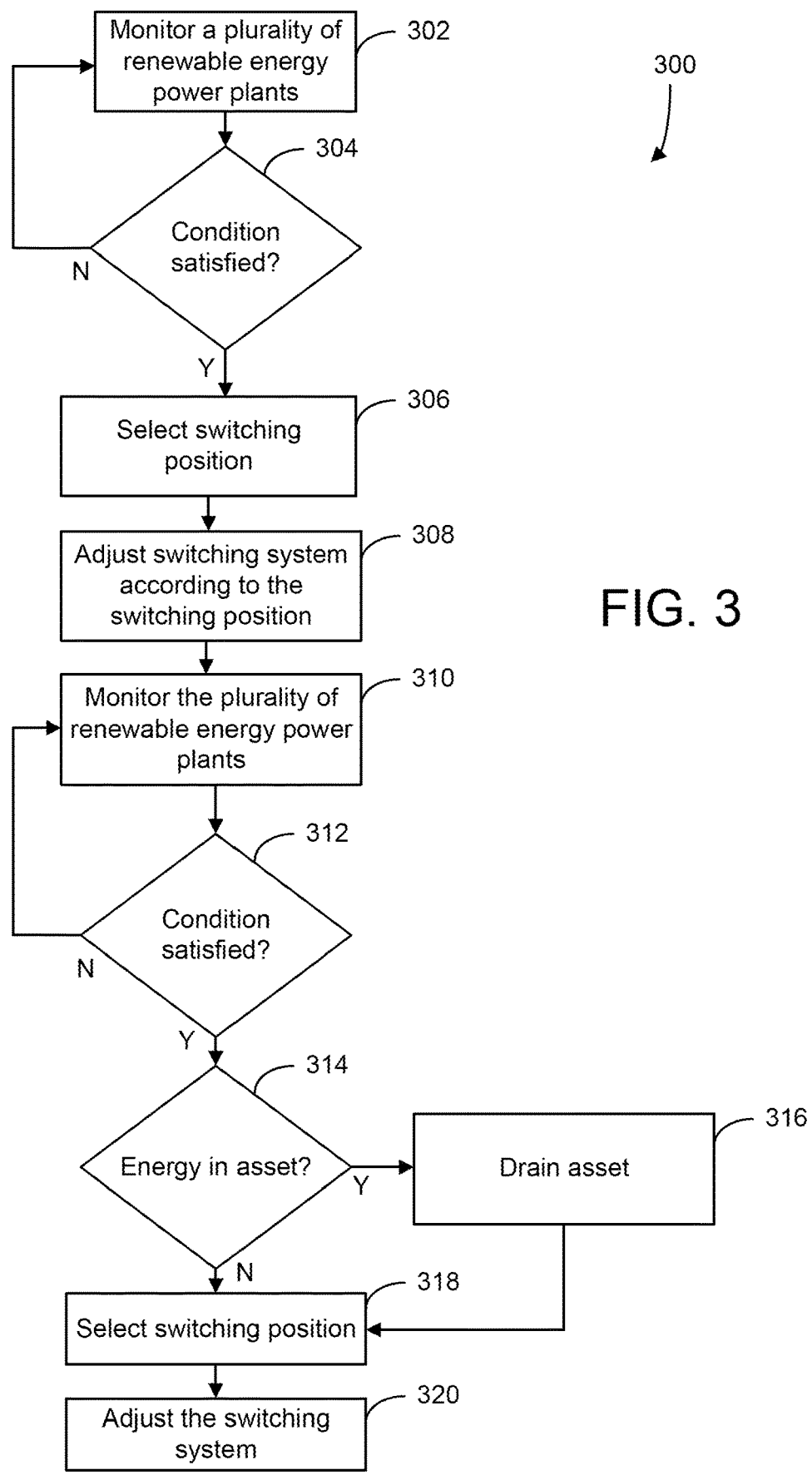
FIG. 3 illustrates a flowchart of an example method for transferring an energy source between renewable energy power plants, according to some embodiments.

FIG. 3 illustrates a method 300 for transferring an energy source between renewable energy power plants, according to some embodiments. The method 300 can be performed by a data processing system (e.g., a controller, the RES–ESS dispatcher unit 36, the ESS controller 22, the RES SCADA controller 12, the computer 1100, the asset controller 202, one or more of the controllers 206, etc.). In some embodiments, the data processing system is the controller of a system that contains an asset (e.g., an ESS, an RES, or a combination of an ESS and an RES) and a switching system that selectively connects the asset to different renewable energy power plants. The asset can be an energy source. The data processing system may monitor different renewable energy power plants to which the switching system can connect the asset. The data processing system can detect an error, malfunction, maintenance period, or other event at an ESS or an RES at one of the renewable energy power plants. Responsive to the detection, the data processing system can adjust the switching position of the switching system to connect the asset to the renewable energy power plant experiencing the error, malfunction, maintenance period, or other event. The asset can operate as a backup or a replacement for the ESS or RES experiencing the error, malfunction, or maintenance period. The data processing system can change the switching position of the switching system over time to connect the asset with different renewable energy power plants. Accordingly, performance of the method 300 can enable the data processing system to control a transferrable asset to operate as a backup energy source and/or energy generation device for different renewable energy power plants over time. The method 300 may include more or fewer operations and the operations may be performed in any order.

At operation 302, the data processing system monitors a plurality of renewable energy power plants. The data processing system may monitor the renewable energy power plants by polling or communicating with controllers (e.g., REPP controllers) that control and/or monitor the components within the renewable energy power plants in which the controllers operate. The controllers can determine or detect an error, malfunction, and/or maintenance period in the ESSs and/or any RES s of the respective renewable energy power plants. The controllers can do so by monitoring such ESSs and/or RESs, communicating with the equipment of the ESSs and/or RESs, identifying maintenance periods from maintenance schedules, and/or identifying a user input. The controllers can transmit indications of the errors, malfunctions, maintenance periods, and/or any other events to the data processing system over time as the controllers detect the events. In some cases, the controllers can store such indications in memory and only transmit the indications to the data processing system responsive to receiving a message (e.g., a poll) from the data processing system.

In some embodiments, the data processing system can monitor the components of the different renewable energy power plants itself. For example, the data processing system can monitor the ESSs and/or RESs of the respective renewable energy power plants to determine when any of the ESSs and/or RESs is experiencing an error or otherwise malfunctioning. The data processing system can store maintenance schedules for the different renewable energy power plants that indicate when the ESS and/or one or more RESs will go offline or down for maintenance. The data processing system can determine when an ESS or RES of a renewable energy power plant is down for maintenance based on the maintenance schedule. Responsive to determining an event, for example, the data processing system can identify the renewable energy power plant experiencing the event.

At operation 304, the data processing system determines if a condition is satisfied. The data processing system may determine when a condition is satisfied based on the monitoring that the data processing system performs in the operation 302. For example, the data processing system may determine a condition is satisfied responsive to receiving a message from a controller of a renewable energy power plant indicating an error, malfunction, maintenance period, or other event at an ESS and/or RES at the renewable energy power plant. The data processing system may similarly determine a condition is satisfied responsive to otherwise determining an error, malfunction, maintenance period, or other event at the ESS and/or RES at the renewable energy power plant. The data processing system may repeat the operations 302 and 304 until determining a condition is satisfied for a renewable energy power plant.

At operation 306, the data processing system selects a switching position for the switching system. The data processing system can select the switching position for the switching based on the renewable energy power plant that is experiencing the event. For example, the data processing system can determine an ESS of a first renewable energy power plant is experiencing a maintenance period (e.g., going down for maintenance). The data processing system can identify a first switching position (e.g., a configuration) for the switching system that corresponds to the first renewable energy power plant experiencing the event from memory. The first switching system can connect or operationally couple (e.g., via a physical switch or a power flow device) the asset with the first renewable energy power plant such that the asset can operate as an energy storage device and/or an energy source for the first renewable energy power plant. The connection or coupling can do so, for example, by connecting or coupling the asset with a bus (e.g., an electrical bus) to which the ESS maintenance period is coupled or was previously coupled.

At operation 308, the data processing system adjusts the switching system. The data processing system can adjust the switching system according to the selected first switching position. For example, the data processing system can transmit a control signal to the switching system that causes a physical switch connecting the asset with the first renewable energy power plant to close and each other physical switch of the switching system to be open. In another example, the data processing system can transmit a control signal to the switching system that causes a power flow device that controls energy transfer between the asset and the first renewable energy power plant to be active and/or each other power flow device of the switching system to be inactive. Upon adjusting the switching system to be in the first switching position, the asset can operate as a backup energy storage device and/or energy generation device for the first renewable energy power plant such that the first renewable energy power plant can meet any contractual agreements with an energy grid and/or offtakers. The asset can additionally operate to power the devices of the first renewable energy power plant.

At operation 310, the data processing system monitors the renewable energy power plants. At operation 312, the data processing system determines if a condition is satisfied. The data processing system can perform the operations 310 and 312 in the same or a similar manner to how the data processing system performs the operations 302 and 304. The data processing system can perform the operations 310 and 312 subsequent to performing the operations 302-308. In doing so, the data processing system can determine that an ESS and/or an RES of a second renewable energy power plant is experiencing an event.

At operation 314, the data processing system determines if there is energy in the asset. For example, the asset may be or include an ESS (e.g., a transferrable ESS). The ESS may have stored energy while the ESS was connected to the first renewable energy power plant. The data processing system can determine the state of charge of the ESS (e.g., the amount of energy in the ESS) by polling the ESS or a device that measures the amount of energy that is stored in the ESS. The data processing system can compare the state of charge to a threshold. The data processing system can determine there is energy in the ESS responsive to determining the state of charge is non-zero (e.g., above zero) or is otherwise above the threshold.

Responsive to determining there is energy in the asset (e.g., energy in the ESS of the asset), at operation 316, the data processing system drains the asset. The data processing can drain the asset by discharging energy from the ESS of the asset until determining the state of charge of the ESS is zero or below the threshold. By doing so, the data processing system can ensure that energy from the first renewable energy power plant is not transferred to the second renewable energy power plant when the switching system connects the asset with the second renewable energy power plant.

At the operation 318, the data processing system selects a switching position. In doing so, the data processing system can select a second switching position from memory. The second switching position may be a switching position in which the asset is connected or operationally coupled with the second renewable energy power plant and not any other renewable energy power plants. The data processing system can select the second switching position responsive to determining the second renewable energy power plant is experiencing the event.

At the operation 320, the data processing system adjusts the switching position of the switching system. The data processing system can adjust the switching position of the switching system to the second switching position. The data processing system can perform the operation 320 in the same or a similar manner to how the data processing system performs the operation 308.

Figure 4:
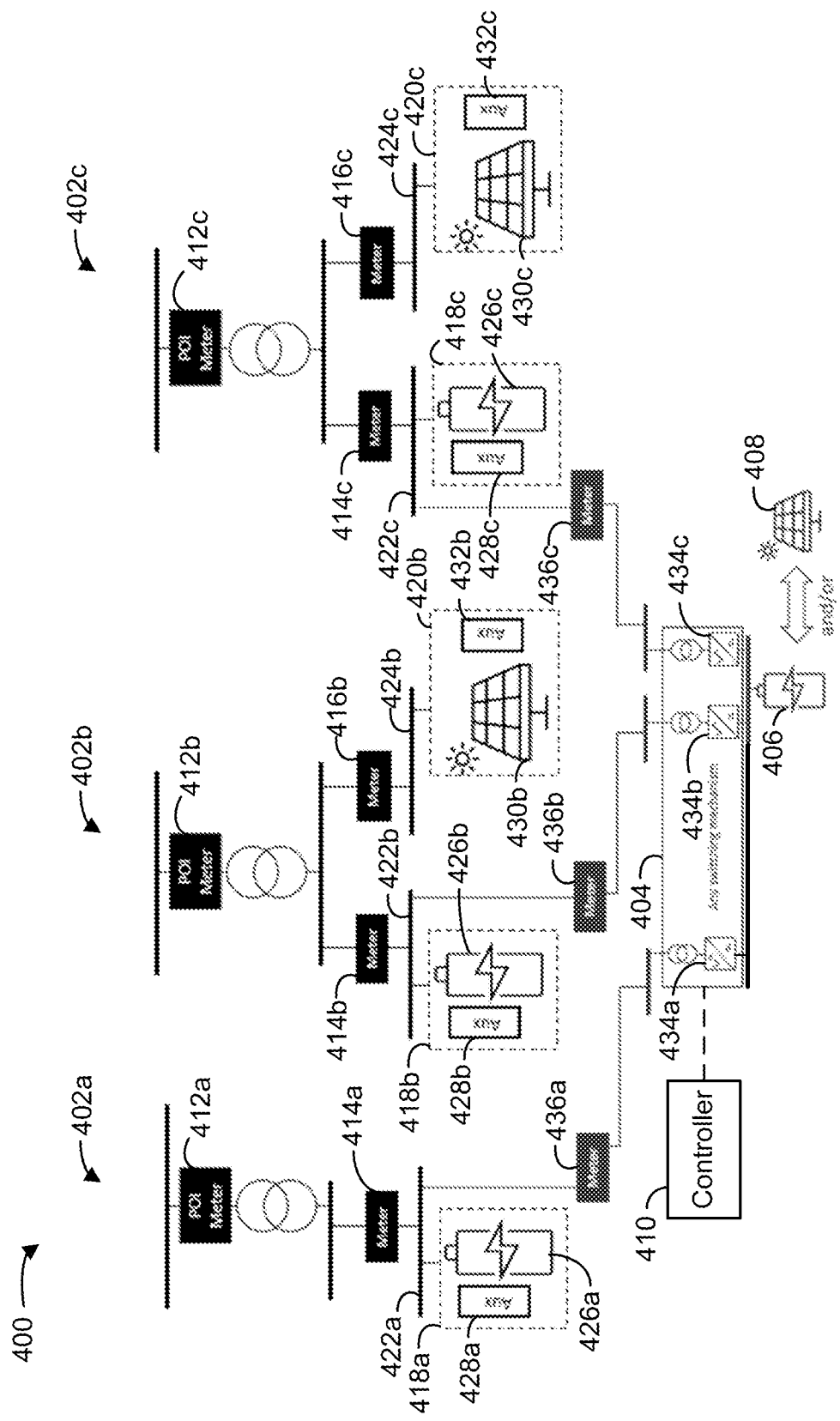
FIG. 4 illustrates an example system for transferring an energy source between renewable energy power plants, according to some embodiments.

FIG. 4 illustrates an example system 400 for transferring an energy source between renewable energy power plants, according to some embodiments. The system 400 may include renewable energy power plants 402a-402c (individually, renewable energy power plant 402, and collectively, renewable energy power plants 402), a switching system 404, an ESS 406, a RES 408, and/or a controller 410. The controller 410 can communicate with the switching system 404 to change the switching position of the switching system 404 to connect the ESS 406 and/or the RES 408 with the different renewable energy power plants 402 to operate as an energy source (e.g., an energy storage device and/or an energy generation device) for the renewable energy power plant 402 to which the ESS 406 and/or RES 408 is connected. The components of the system 400 can be the same as or otherwise operate similarly to the components of the system 200.

The different renewable energy power plants 402 can respectively include point of interconnection (POI) meters 412a-c (individually, POI meter 412, and collectively, POI meters 412), ESS meters 414a-c (individually, ESS meter 414, and collectively, ESS meters 414), RES meters 416b-c (individually, RES meter 416, and collectively, RES meters 416), ESS systems 418a-c (individually, ESS system 418, and collectively, ESS systems 418), and/or RES systems 420b-c (individually, RES system 420, and collectively, RES systems 420). The renewable energy power plants 402 can connect with an energy grid (e.g., the same energy grid) through the POI meters 412. The ESS systems 418 can be connected with the POI meters 412 through ESS buses 422a-c (individually, ESS bus 422, and collectively, ESS buses 422). The RES systems 420 can be connected with the POI meters 412 through RES buses 424b-c (individually, RES bus 424, and collectively, RES buses 424).

The ESS systems 418 can respectively include ESSs 426a-c (individually, ESS 426, and collectively, ESSs 426) and ESS devices 428a-c (individually, ESS device 428, and collectively, ESS devices 428). The ESSs 426 can connect with the respective ESS devices 428 of the same ESS systems 418 through the ESS buses 422. Accordingly, the ESSs 426 can respectively power or provide energy to the ESS devices 428 to operate.

The RES systems 420 can respectively include RESs 430b-c (individually, RES 430, and collectively, RESs 430) and RES devices 432b-c (individually, RES device 432, and collectively, RES devices 432). The RESs 430 can be or include any type of renewable energy source. The RESs 430 can connect with the respective RES devices 432 of the same RES systems 420 through the RES buses 424. Accordingly, the RESs 430 can respectively power or provide energy to the RES devices 432 to operate.

The switching system 404 can include switches 434a-c (individually, switch 434, and collectively, switches 434). Each of the switches 434 can be configured to connect and/or disconnect the ESS 406 and/or the RES 408 with or from a different renewable energy power plant 402.

The system 400 can include one or both of the ESS 406 and the RES 408. The ESS 406 and/or the RES 408 can be an asset (e.g., a transferrable asset) that can connect or operationally couple with the different renewable energy power plants 402 over time. In some cases, the RES 408 can generate and store energy in the ESS 406 over time. As illustrated, the ESS 406 and/or the RES 408 can connect with the ESS buses 422 of the renewable energy power plants 402. Accordingly, the ESS 406 and/or the RES 408 can operate to replace operation of the ESSs 426 when the ESSs 426 respectively go down for maintenance, experience an error, and/or malfunction. In some cases, the system 400 may only include the ESS 406 to ensure only non-renewable energy is transferred to the ESS buses 422 and not renewable energy, such as for regulatory compliance.

The controller 410 can control the switching position of the switching system 404 to connect the ESS 406 and/or the RES 408 with different renewable energy power plants 402 over time. For example, the controller 410 as described above, the controller 410 can detect an error, malfunction, and/or maintenance period for the ESS 426. Responsive to doing so, the controller 410 can adjust the switching position of the switching system 404 to connect the ESS 406 and/or the RES 408 with the ESS bus 422b. In some cases, the controller 410 can transmit a control signal to disconnect the ESS 426b from the ESS bus 422b. While the ESS 406 and the RES 408 are connected to the ESS bus 422b, the ESS 406 and the RES 408 can operate to store energy, power the ESS devices 428b, and/or direct energy to the energy grid through the POI meter 412 in place of the ESS 426.

The controller 410 can control the switching system 404 based on measurements from meters 436a-c (individually, meter 436, and collectively, meters 436). For example, the controller 410 can control the switching system 404 to avoid intermingling energy between different renewable energy power plants 402. The controller 410 can keep track of the amount of energy the ESS 406 has directed to individual renewable energy power plants 402 and received from renewable energy power plants 402 based on readings of the meters 436. Responsive to determining the ESS 406 has begun to discharge more energy to a renewable energy power plant 402 than the ESS 406 has received, the controller 410 can transmit a control signal to the ESS 406 to stop the ESS 406 from discharging energy to the renewable energy power plant and/or transmit a control signal to the switching system 404 to disconnect the ESS 406 from the renewable energy power plant 402.

Figure 5:
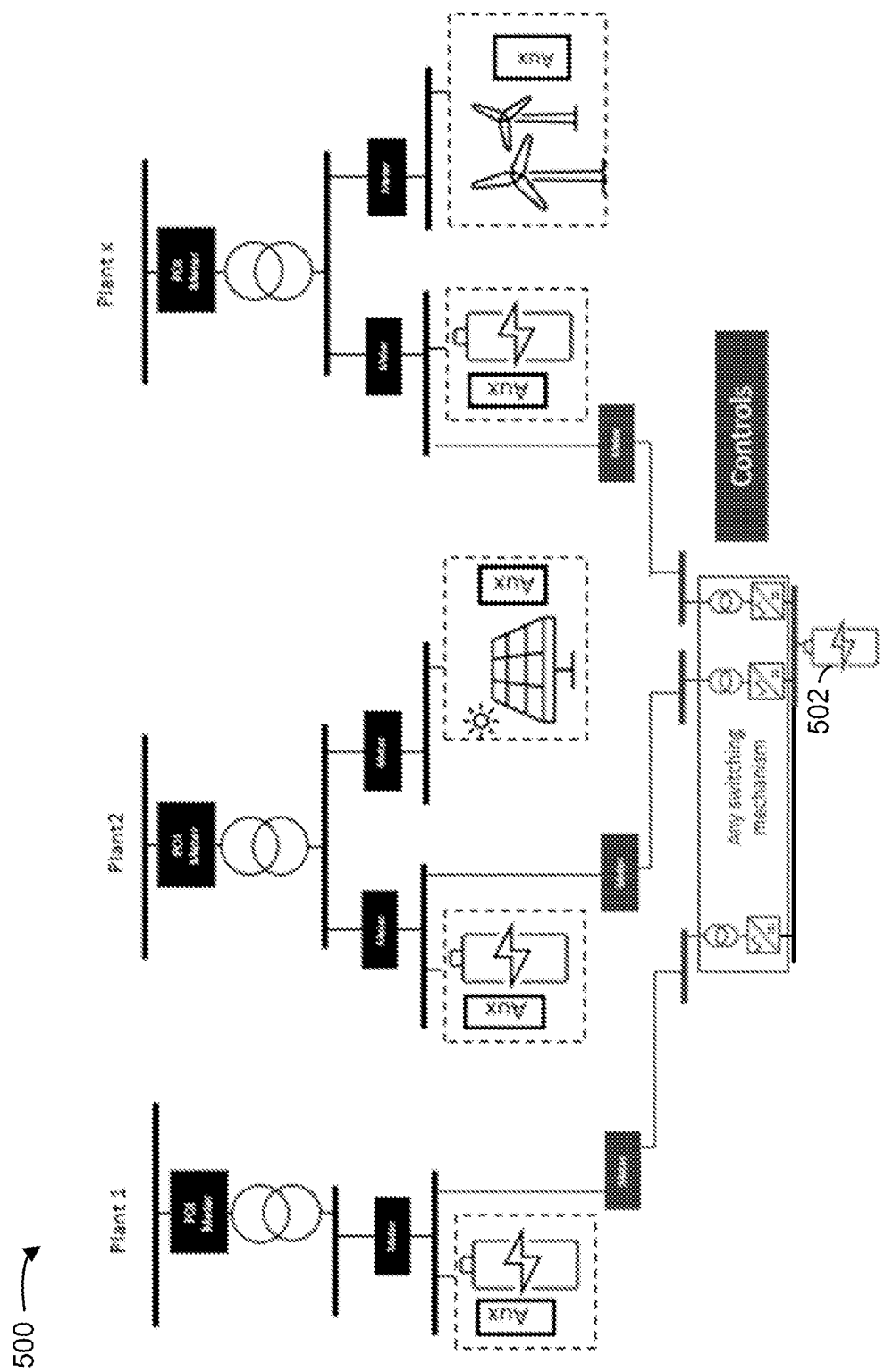
FIG. 5 illustrates an example system for transferring an energy source between renewable energy power plants, according to some embodiments.

FIG. 5 illustrates an example system 500 for transferring an energy source between renewable energy power plants, according to some embodiments. The system 500 can be the same as or similar to the system 200 and/or 400. The system 500 may only include an ESS 502 that can transfer between different renewable energy power plants. The ESS 502 can operate as an energy storage device for different renewable energy power plants, as described herein. A benefit of only including the ESS 502 and not an RES that can transfer between renewable energy power plants is that the system 500 can avoid transmitting renewable energy through ESS systems of the renewable energy power plants and intermingling renewable energy with non-renewable energy, which may not be allowed under certain regulatory regimes.

Figure 6:
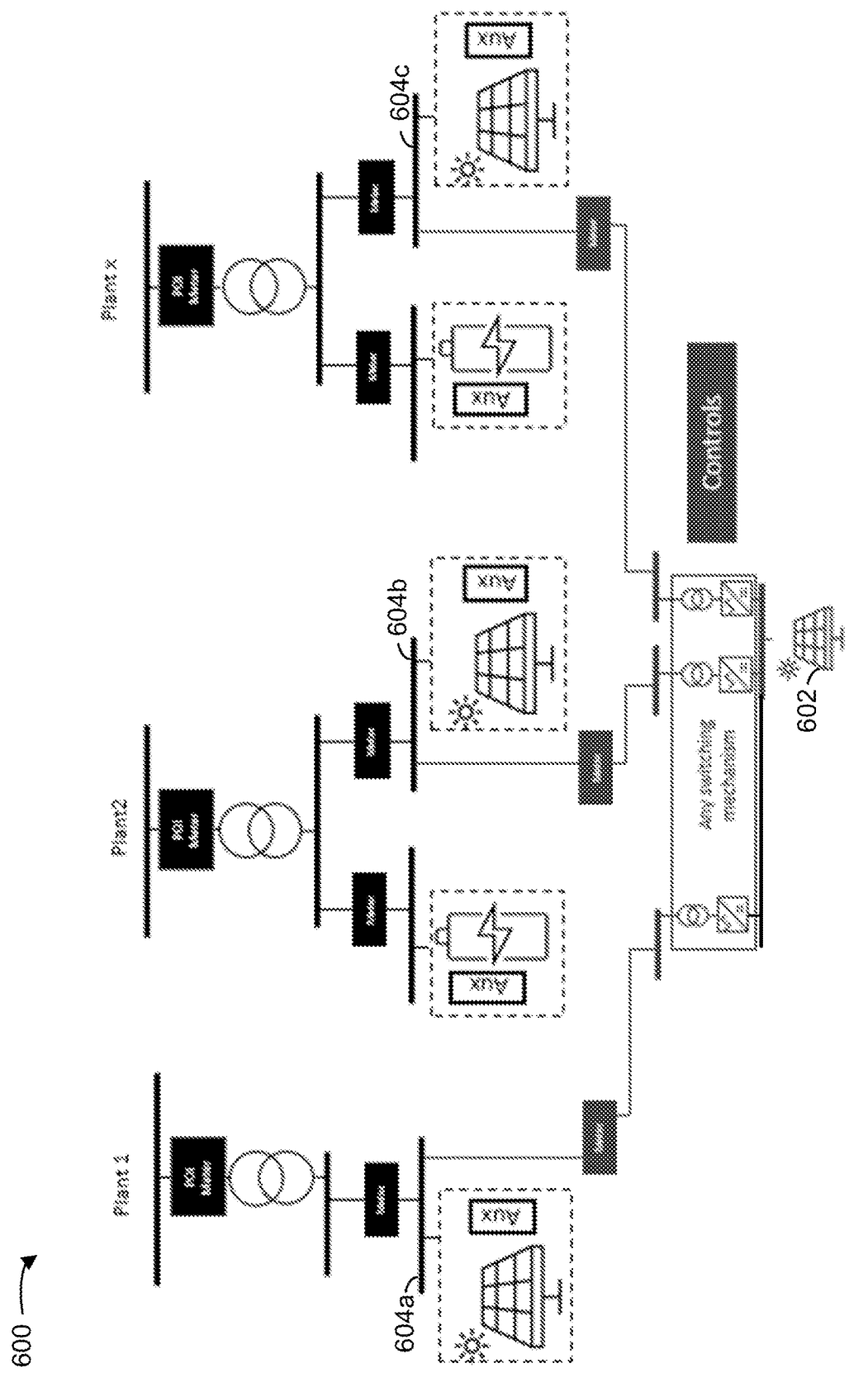
FIG. 6 illustrates an example system for transferring an energy source between renewable energy power plants, according to some embodiments.

FIG. 6 illustrates an example system 600 for transferring an energy source between renewable energy power plants, according to some embodiments. The system 600 can be similar to (e.g., have the same or similar components to) the system 200 and/or 400. The system 600 may only include an RES 602 that can transfer between different renewable energy power plants. The RES 602 can be any type of renewable energy source. The RES 602 can operate as an energy generation device for different renewable energy power plants, as described herein. The RES may connect with different RES buses 604a-c that can provide power to devices of respective RES systems and/or to the energy grid through points of interconnect of the respective renewable energy power plants. A benefit of only including the RES 602 and not an ESS that can transfer between renewable energy power plants is that the system 600 can avoid transmitting non-renewable energy through the RES systems of the renewable energy power plants and intermingle non-renewable energy with renewable energy, which may not be allowed under certain regulatory regimes.

Figure 7:
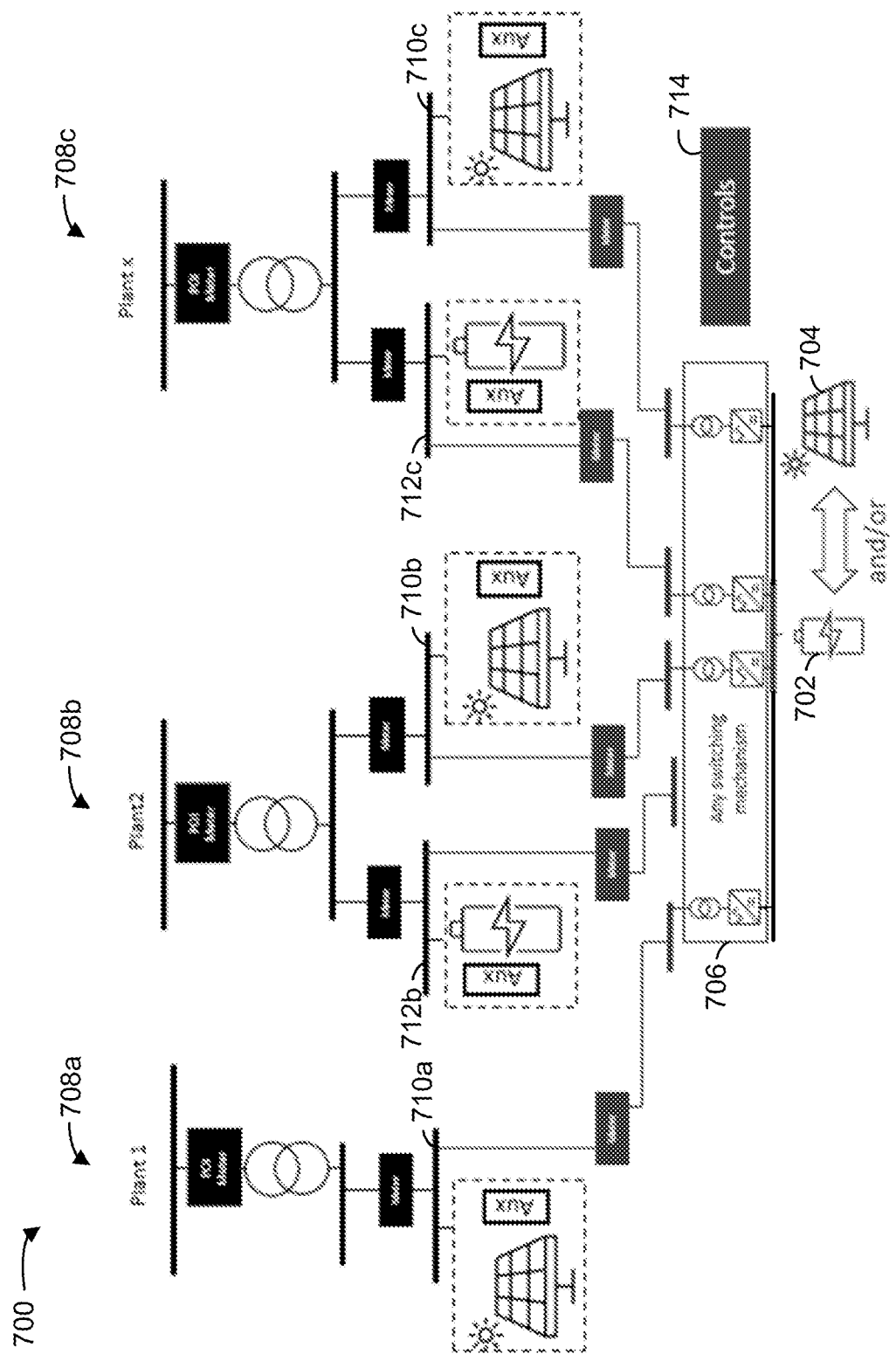
FIG. 7 illustrates an example system for transferring an energy source between renewable energy power plants, according to some embodiments.

FIG. 7 illustrates an example system 700 for transferring an energy source between renewable energy power plants, according to some embodiments. The system 700 can be similar to (e.g., have the same or similar components to) the system 200 and/or 400. The system 700 may include one or both of an ESS 702 and/or a RES 704. The RES 704 can be or include any type of renewable energy source. Through a switching system 706, the ESS 702 and/or the RES 704 can provide energy to different renewable energy power plants 708a-c (individually, renewable energy power plant 708, and collectively, renewable energy power plants 708). The switching system 706 can connect the ESS 702 and/or the RES 704 to different buses of the renewable energy power plants 708. For example, the renewable energy power plants 708 may respectively include RES buses 710a-c (individually, RES bus 710, and collectively, RES buses 710) and ESS buses 712b-c (individually, ESS bus 712, and collectively, ESS buses 712). The switching system 706 can connect the ESS 702 and/or the RES 704 with the different buses 710 and/or 712 depending on the error, malfunction, maintenance period, or other event that is occurring.

For example, a controller 714 of the system 700 can monitor the different renewable energy power plants 708 as described herein. The controller 714 can detect an error in a RES of the renewable energy power plant 708c. Responsive to detecting the error, the controller 714 can determine a switching position that connects the ESS 702 and/or the RES 704 with the RES bus 710c. In some cases, the controller 714 or a controller of the renewable energy power plant 708c can disconnect the RES experiencing the error from the RES bus 710c. The controller 714 can adjust the switching position of the switching system 706 such that the ESS 702 and/or the RES 704 are connected to the RES bus 710c. In doing so, the controller 714 can connect the ESS 702 and/or the RES 704 with only the RES bus 710c and not any other buses. The controller 714 can similarly connect the ESS 702 and/or the RES 704 to an ESS bus 712 connected to a malfunctioning ESS. Accordingly, the ESS 702 and/or the RES 704 can operate in place of or in conjunction with the RES experiencing the error to satisfy any commitments made by the renewable energy power plant 708 and/or to power any devices connected with the RES bus 710c that may have relied on the RES experiencing the error. The ESS 702 and/or the RES 704 can do so without creating a connection between the RES bus 710c and the ESS bus 712c or any other renewable energy power plants 708, which may aid in regulatory and/or contractual compliance.

Advantageously, by performing the systems and methods described herein individual renewable energy power plants can be built without additional equipment for redundancy. Instead, a transferable ESS and/or RES (e.g., the transferrable asset) can be used as redundant equipment for any renewable energy power plant that has a failure. Transferring an asset (e.g., energy source) between two or more renewable energy power plants can boost the reliability of the renewable energy power plants without moving energy between the plants, which can be accomplished by tracking the state of charge of the transferrable ESS and/or depleting the transferrable ESS prior to switching to connect with different renewable energy power plants. In doing so, the transferrable asset can be transferred between multiple renewable energy power plants and support the production of a renewable energy power plant if the renewable energy power plant has down equipment or to act as an AC overbuild renewable energy power plant.

Transferring an asset between two (or more) renewable energy power plants can be used to boost the reliability of the renewable energy power plant without moving energy between the renewable energy power plants. A transferrable ESS can be transferred between renewable energy power plants to compensate for the loss of a failed legacy ESS asset or an asset that is switched off due to scheduled maintenance.

In at least one aspect, the present disclosure describes a system. The system can include an energy source; a switching system configured to selectively couple the energy source with only one of a plurality of renewable energy power plants (REPPs), each of the plurality of REPPs comprising a REPP controller and at least one of an energy system (ESS) or and a renewable energy source (RES); and a controller in communication with the switching system and the REPP controller of each of the plurality of REPPs. The controller can be configured to receive, from a first REPP controller operating within a first REPP, an indication of an event at the first REPP; and responsive to receipt of the indication, adjust a switching position of the switching system to a first switching position to enable the energy source to provide energy to the first REPP and not any other REPP of the plurality of REPPs.

In some embodiments, the first REPP controller transmits the indication of the event at the first REPP in response to a first ESS of the first REPP malfunctioning or undergoing maintenance. In some embodiments, the energy source is a transferable ESS, wherein the first REPP controller transmits the indication of the event at the first REPP in response to a first ESS of the first REPP malfunctioning or undergoing maintenance, and wherein the controller is configured to adjust the switching position of the switching system to enable the energy source to provide energy to the first REPP by causing the transferable ESS to connect to a common electrical bus with the first ESS.

In some embodiments, the energy source is a transferable RES, wherein the first REPP controller transmits the indication of the event at the first REPP in response to a first RES of the first REPP malfunctioning or undergoing maintenance, and wherein the controller is configured to adjust the switching position of the switching system to enable the energy source to provide energy to the first REPP by causing the transferable RES to connect to a common electrical bus with the first RES. In some embodiments, the switching system comprises a plurality of switches, each of the plurality of switches configured to selectively connect the energy source with a different REPP of the plurality of REPPs, and wherein the controller is configured to adjust the switching position of the switching system to the first switching position to enable the energy source to provide energy to the first REPP by causing a first switch configured to connect the energy source with the first REPP to be closed and each other switch of the plurality of switches to be open.

In some embodiments, the switching system comprises a plurality of power flow devices, each of the plurality of power flow devices configured to selectively activate to couple the energy source with a different REPP of the plurality of REPPs, and wherein the controller is configured to adjust the switching position of the switching system to enable the energy source to provide energy to the first REPP by causing a first power flow device to be activated to connect the energy source with the first REPP and each other power flow device of the plurality of power flow devices to be inactivated.

In some embodiments, the first power flow device is an inverter. In some embodiments, the energy source comprises a transferrable ESS and RES. In some embodiments, the energy source is a transferrable ESS, and wherein the controller is configured to receive, from a second REPP controller operating within a second REPP, a second indication of a second event at the second REPP; and responsive to receipt of the indication: determine there is energy stored in the transferrable ESS that originated at the first REPP; responsive to the determination, discharge all of the energy from the transferrable ESS; and responsive to determining there is not any energy in the transferrable ESS, adjust the switching position of the switching system from the first switching position to a second switching position to enable the transferrable ESS to provide energy to the second REPP.

In some embodiments, the controller is configured to monitor each of the plurality of REPPs; determine a score for each of the plurality of REPPs; compare the scores of the plurality of REPPs; and adjust the switching position of the switching system to a second switching position to enable the energy source to provide energy to a second REPP responsive to determining a second score for the second REPP satisfies a condition. In some embodiments, the controller is configured to determine the score for each of the plurality of REPPs based on a value of energy provided by each of the plurality of REPPs to an energy grid for a time period. In some embodiments, in the first switching position the switching system facilitates the energy source providing energy to devices operating within the first REPP. In some embodiments, in the first switching position, the energy source is configured to replace a first ESS of the first REPP such that the first REPP meets a charging/discharging schedule using the energy source and not the first ESS.

In some embodiments, a second REPP controller transmits an indication of a second event at a second REPP in response to determining an amount of curtailment of a first RES of the second REPP satisfies a condition. In some embodiments, the second REPP controller determines the amount of curtailment of the first RES of the second REPP satisfies a condition by detecting curtailment of the first RES. In some embodiments, the second REPP determines the amount of curtailment of the first RES of the second REPP satisfies a condition by determining the amount of curtailment of the first RES satisfies a threshold.

In some embodiment, the energy source is a transferrable ESS and the controller is configured to: receive, from a second REPP controller operating within a second REPP, a second indication of a second event at the second REPP; and responsive to receipt of the indication: adjust the switching position of the switching system from the first switching position to a second switching position to enable the transferrable ESS to provide energy to the second REPP and receive energy from the second REPP; measure energy received from the second REPP over a period of time while the switching system is in the second switching position; and based on the measurements of the energy received from the second REPP, discharge energy from the transferrable ESS such that the ESS does not provide more energy to the second REPP than the transferrable ESS receives from the second REPP during the period of time.

In one aspect, the present disclosure describes a method. The method can include receiving, by a controller from a first renewable energy power plant (REPP) controller operating within a first REPP, an indication of the event at the first REPP; determining, by the controller and based on the indication of the event at the first REPP, a first switching position of a switching system configured to selectively couple an energy source with only one of a plurality of renewable energy power plants (REPPs), each of the plurality of REPPs comprising a REPP controller and at least one of an energy storage system (ESS) or a renewable energy source (RES); and transmitting, by the controller, a control signal to the switching system to cause the switching system to switch to the first switching position to enable the energy source to provide energy to the first REPP and not to any other REPPs of the plurality of REPPs. In some embodiments, the first REPP controller transmits the indication of the event at the first REPP in response to a first ESS of the first REPP malfunctioning or undergoing maintenance.

In one aspect, the present disclosure describes a non-transitory computer-readable medium comprising computer-executable instructions embodied thereon that, when executed by a processor, cause the processor to perform a method comprising receiving, from a first renewable energy power plant (REPP) controller operating within a first REPP, an indication of the event at the first REPP; determining, based on the indication of the event at the first REPP, a first switching position of a switching system configured to selectively couple an energy source with only one of a plurality of renewable energy power plants (REPPs), each of the plurality of REPPs comprising a REPP controller and at least one of an energy storage system (ESS) or a renewable energy source (RES); and transmitting a control signal to the switching system to cause the switching system to switch to the first switching position to enable the energy source to provide energy to the first REPP and not to any other REPPs of the plurality of REPPs. In some embodiments, the first REPP controller transmits the indication of the event at the first REPP in response to a first ESS of the first REPP malfunctioning or undergoing maintenance.

Computing Environment

Having discussed specific embodiments of the present solution, it may be helpful to describe aspects of the operating environment as well as associated system components (e.g., hardware elements) in connection with the methods and systems described herein.

Figure 8A:
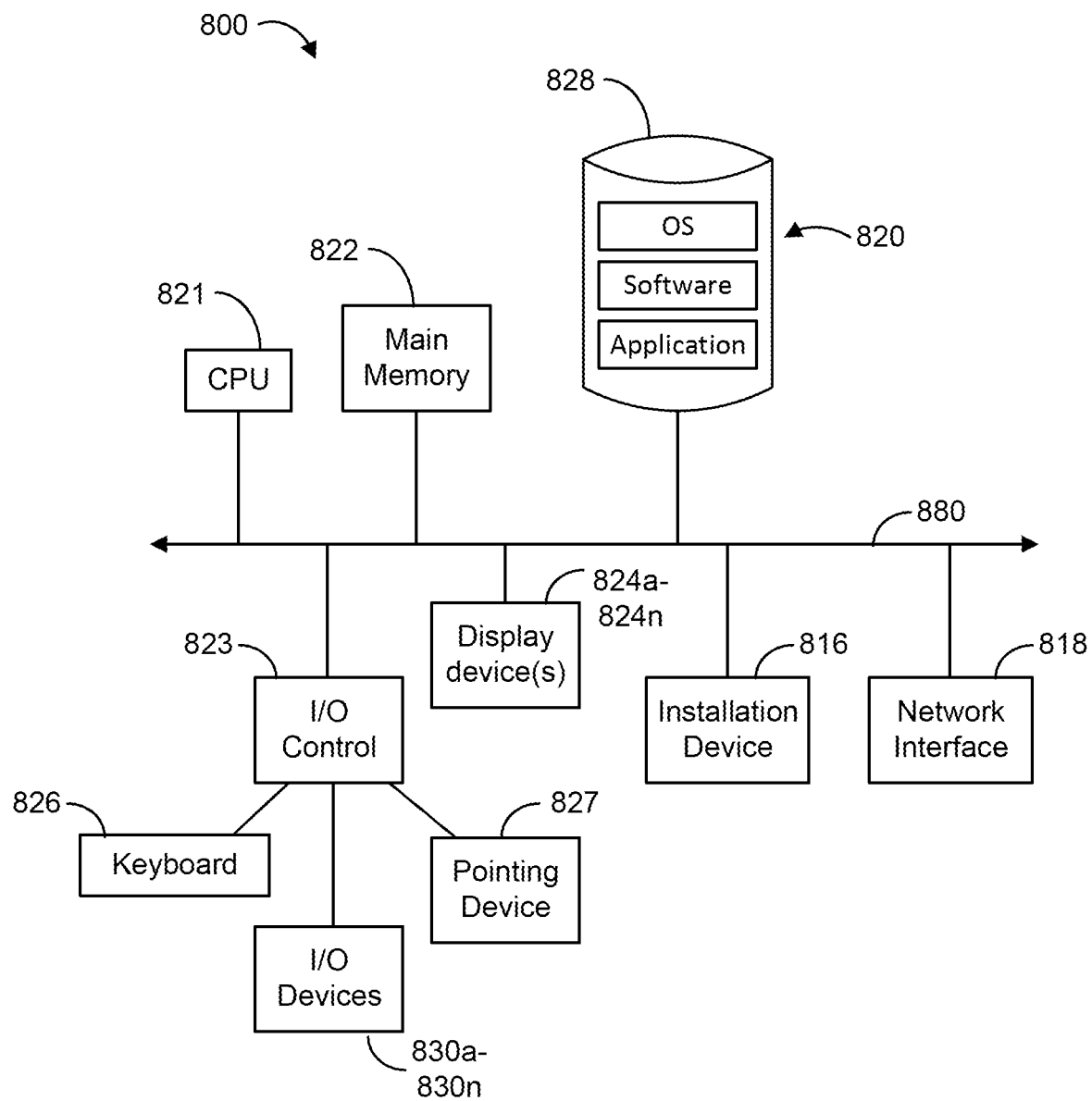
FIGS. 8A and 8B are block diagrams depicting embodiments of computing devices useful in connection with the methods and systems described herein.
Figure 8B:
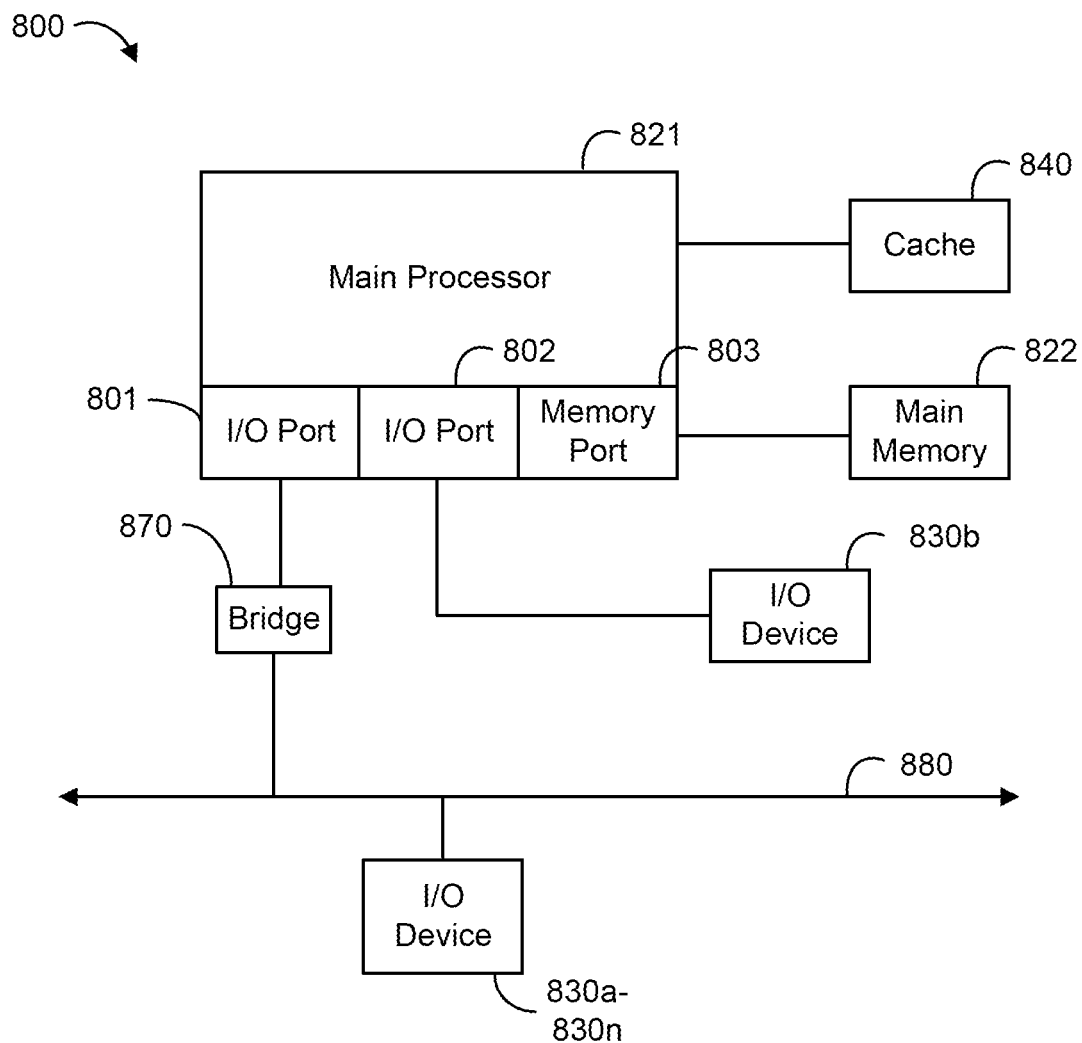

The systems discussed herein may be deployed as and/or executed on any type and form of computing device, such as a computer, network device or appliance capable of communicating on any type and form of network and performing the operations described herein. FIGS. 8A and 8B depict block diagrams of a computing device 800 useful for practicing an embodiment of the systems and methods described herein. The computing device 800 may be, for example, one or more of the asset controller 202 and/or the controllers 206, shown and described with reference to FIG. 2. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 800 may be based on any of these processors, or any other processor capable of operating as described herein.

The main memory unit 822 may be one or more memory chips capable of storing data and allowing any storage location to be directly accessed by the central processing unit 821, such as any type or variant of Static random access memory (SRAM), Dynamic random access memory (DRAM), Ferroelectric RAM (FRAM), NAND Flash, NOR Flash and Solid State Drives (SSD). The main memory unit 822 may be based on any of the above described memory chips, or any other available memory chips capable of operating as described herein. In the embodiment shown in FIG. 8A, the central processing unit 821 communicates with main memory unit 822 via a system bus 880 (described in more detail below). FIG. 8B depicts an embodiment of a computing device 800 in which the processor communicates directly with the main memory unit 822 via a memory port 803. For example, in FIG. 8B the main memory unit 822 may be DRDRAM.

FIG. 8B depicts an embodiment in which the central processing unit 821 communicates directly with cache memory 840 via a secondary bus, sometimes referred to as a backside bus. In other embodiments, the central processing unit 821 communicates with cache memory 840 using the system bus 880. Cache memory 840 typically has a faster response time than main memory unit 822 and is provided by, for example, SRAM, BSRAM, or EDRAM. In the embodiment shown in FIG. 8B, the central processing unit 821 communicates with various I/O devices 830 via a local system bus 880. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the central processing unit 821 may use an Advanced Graphics Port (AGP) to communicate with the display 824. FIG. 8B depicts an embodiment of a computer 800 in which the central processing unit 821 may communicate directly with I/O device 830b, for example via HYPERTRANSPORT, RAPIDIO, or INFINIBAND communications technology. FIG. 8B also depicts an embodiment in which local buses and direct communication are mixed: the central processing unit 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation device 816 for the computing device 800. In still other embodiments, the computing device 800 may provide USB connections (not shown) to receive handheld USB storage devices such as the USB Flash Drive line of devices manufactured by Twintech Industry, Inc., of Los Alamitos, California.

Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some implementations, the computing device 800 may include or be connected to one or more display devices 824a-824n. As such, any of the I/O devices 830a-830n and/or the I/O controller 823 may include any type and/or form of suitable hardware, software, or combination of hardware and software to support, enable or provide for the connection and use of the display device(s) 824a-824n by the computing device 800. For example, the computing device 800 may include any type and/or form of video adapter, video card, driver, and/or library to interface, communicate, connect or otherwise use the display device(s) 824a-824n. In one embodiment, a video adapter may include multiple connectors to interface to the display device(s) 824a-824n. In other embodiments, the computing device 800 may include multiple video adapters, with each video adapter connected to the display device(s) 824a-824n. In some implementations, any portion of the operating system of the computing device 800 may be configured for using multiple displays 824a-824n. One ordinarily skilled in the art will recognize and appreciate the various ways and embodiments that a computing device 800 may be configured to have one or more display devices 824a-824n.

In further embodiments, an I/O device 830 may be a bridge between the system bus 880 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 800 of the sort depicted in FIGS. 8A and 8B may operate under the control of an operating system, which control scheduling of tasks and access to system resources. The computing device 800 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 800 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 800 has sufficient processor power and memory capacity to perform the operations described herein.

In some implementations, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
   an energy source;
   a switching system configured to selectively couple the energy source with only one of a plurality of renewable energy power plants (REPPs), each of the plurality of REPPs comprising a REPP controller and at least one of an energy storage system (ESS) or a renewable energy source (RES); and
   a controller in communication with the switching system and the REPP controller of each of the plurality of REPPs, the controller configured to:
      receive, from a first REPP controller operating within a first REPP, an indication of an event at the first REPP; and
      responsive to receipt of the indication, adjust a switching position of the switching system to a first switching position to enable the energy source to provide energy to the first REPP and not any other REPP of the plurality of REPPs.

2. The system of claim 1, wherein the first REPP controller transmits the indication of the event at the first REPP in response to a first ESS of the first REPP malfunctioning or undergoing maintenance.

3. The system of claim 1, wherein the energy source is a transferable ESS,
   wherein the first REPP controller transmits the indication of the event at the first REPP in response to a first ESS of the first REPP malfunctioning or undergoing maintenance, and
   wherein the controller is configured to adjust the switching position of the switching system to enable the energy source to provide energy to the first REPP by causing the transferable ESS to connect to a common electrical bus with the first ESS.

4. The system of claim 1, wherein the energy source is a transferable RES,
   wherein the first REPP controller transmits the indication of the event at the first REPP in response to a first RES of the first REPP malfunctioning or undergoing maintenance, and
   wherein the controller is configured to adjust the switching position of the switching system to enable the energy source to provide energy to the first REPP by causing the transferable RES to connect to a common electrical bus with the first RES.

5. The system of claim 1, wherein the switching system comprises a plurality of switches, each of the plurality of switches configured to selectively connect the energy source with a different REPP of the plurality of REPPs, and
   wherein the controller is configured to adjust the switching position of the switching system to the first switching position to enable the energy source to provide energy to the first REPP by causing a first switch configured to connect the energy source with the first REPP to be closed and each other switch of the plurality of switches to be open.

6. The system of claim 1, wherein the switching system comprises a plurality of power flow devices, each of the plurality of power flow devices configured to selectively activate to couple the energy source with a different REPP of the plurality of REPPs, and
   wherein the controller is configured to adjust the switching position of the switching system to enable the energy source to provide energy to the first REPP by causing a first power flow device to be activated to connect the energy source with the first REPP and each other power flow device of the plurality of power flow devices to be inactivated.

7. The system of claim 6, wherein the first power flow device is an inverter.

8. The system of claim 1, wherein the energy source comprises a transferrable ESS and RES.

9. The system of claim 1, wherein the energy source is a transferrable ESS, and wherein the controller is configured to:
   receive, from a second REPP controller operating within a second REPP, a second indication of a second event at the second REPP; and
   responsive to receipt of the indication:
      determine there is energy stored in the transferrable ESS that originated at the first REPP;
      responsive to the determination, discharge all of the energy from the transferrable ESS; and responsive to determining there is not any energy in the transferrable ESS, adjust the switching position of the switching system from the first switching position to a second switching position to enable the transferrable ESS to provide energy to the second REPP.

10. The system of claim 1, wherein the controller is configured to:
monitor each of the plurality of REPPs;
determine a score for each of the plurality of REPPs;
compare the scores of the plurality of REPPs; and
adjust the switching position of the switching system to a second switching position to enable the energy source to provide energy to a second REPP responsive to determining a second score for the second REPP satisfies a condition.

11. The system of claim 10, wherein the controller is configured to determine the score for each of the plurality of REPPs based on a value of energy provided by each of the plurality of REPPs to an energy grid for a time period.

12. The system of claim 1, wherein, in the first switching position, the switching system facilitates the energy source providing energy to devices operating within the first REPP.

13. The system of claim 1, wherein, in the first switching position, the energy source is configured to replace a first ESS of the first REPP such that the first REPP meets a charging/discharging schedule using the energy source and not the first ESS.

14. The system of claim 1, wherein a second REPP controller transmits an indication of a second event at a second REPP in response to determining an amount of curtailment of a first RES of the second REPP satisfies a condition.

15. The system of claim 14, wherein the second REPP controller determines the amount of curtailment of the first RES of the second REPP satisfies a condition by detecting curtailment of the first RES.

16. The system of claim 14, wherein the second REPP determines the amount of curtailment of the first RES of the second REPP satisfies a condition by determining the amount of curtailment of the first RES satisfies a threshold.

17. The system of claim 1, wherein the energy source is a transferrable ESS, and wherein the controller is configured to:
receive, from a second REPP controller operating within a second REPP, a second indication of a second event at the second REPP; and
responsive to receipt of the indication:
adjust the switching position of the switching system from the first switching position to a second switching position to enable the transferrable ESS to provide energy to the second REPP and receive energy from the second REPP;
measure energy received from the second REPP over a period of time while the switching system is in the second switching position; and
based on the measurements of the energy received from the second REPP, discharge energy from the transferrable ESS such that the ESS does not provide more energy to the second REPP than the transferrable ESS receives from the second REPP during the period of time.

18. A method, comprising:
receiving, by a controller from a first renewable energy power plant (REPP) controller operating within a first REPP, an indication of an event at the first REPP;
determining, by the controller and based on the indication of the event at the first REPP, a first switching position of a switching system configured to selectively couple an energy source with only one of a plurality of renewable energy power plants (REPPs), each of the plurality of REPPs comprising a REPP controller and at least one of an energy storage system (ESS) or a renewable energy source (RES); and
transmitting, by the controller, a control signal to the switching system to cause the switching system to switch to the first switching position to enable the energy source to provide energy to the first REPP and not to any other REPPs of the plurality of REPPs.

19. The method of claim 18, wherein the first REPP controller transmits the indication of the event at the first REPP in response to a first ESS of the first REPP malfunctioning or undergoing maintenance.

20. A non-transitory computer-readable medium comprising computer-executable instructions embodied thereon that, when executed by a processor, cause the processor to perform a method comprising:
receiving, from a first renewable energy power plant (REPP) controller operating within a first REPP, an indication of an event at the first REPP;
determining, based on the indication of the event at the first REPP, a first switching position of a switching system configured to selectively couple an energy source with only one of a plurality of renewable energy power plants (REPPs), each of the plurality of REPPs comprising a REPP controller and at least one of an energy storage system (ESS) or a renewable energy source (RES); and
transmitting a control signal to the switching system to cause the switching system to switch to the first switching position to enable the energy source to provide energy to the first REPP and not to any other REPPs of the plurality of REPPs.

21. The non-transitory computer-readable medium of claim 20, wherein the first REPP controller transmits the indication of the event at the first REPP in response to a first ESS of the first REPP malfunctioning or undergoing maintenance.

* * * * *

UNITED STATES PATENT AND TRADEMARK OFFICE
CERTIFICATE OF CORRECTION

PATENT NO. : 11,831,162 B1
APPLICATION NO. : 18/359756
DATED : November 28, 2023
INVENTOR(S) : Nadim Kanan Page 1 of 1

It is certified that error appears in the above-identified patent and that said Letters Patent is hereby corrected as shown below:

On the Title Page

(54) title of invention should read "SYSTEMS AND METHODS FOR TRANSFERRING AN ENERGY SOURCE ASSET BETWEEN RENEWABLE ENERGY POWER PLANTS"

In the Specification

In Column 1, Lines 1-2, the please delete title "SYSTEMS SOURCE ASSET BETWEEN RENEWABLE ENERGY POWER PLANTS"; and insert correct title "SYSTEMS AND METHODS FOR TRANSFERRING AN ENERGY SOURCE ASSET BETWEEN RENEWABLE ENERGY POWER PLANTS."

Signed and Sealed this
Ninth Day of January, 2024

Katherine Kelly Vidal
*Director of the United States Patent and Trademark Office*